(12) United States Patent
Scanlon et al.

(10) Patent No.: US 10,841,508 B2
(45) Date of Patent: Nov. 17, 2020

(54) ELECTRICAL CABINET INFRARED MONITOR SYSTEMS AND METHODS

(71) Applicant: FLIR Systems, Inc., Wilsonville, OR (US)

(72) Inventors: Thomas J. Scanlon, Hampstead, NH (US); Michael Fox, Nashua, NH (US); Nicholas Högasten, Santa Barbara, CA (US); Theodore R. Hoelter, Goleta, CA (US); Katrin Strandemar, Rimbo (SE); Pierre Boulanger, Goleta, CA (US); Barbara Sharp, Santa Barbara, CA (US); Mark Nussmeier, Goleta, CA (US); Eric A. Kurth, Santa Barbara, CA (US)

(73) Assignee: FLIR SYSTEMS, INC., Wilsonville, OR (US)

( * ) Notice: Subject to any disclaimer, the term of this patent is extended or adjusted under 35 U.S.C. 154(b) by 1250 days.

(21) Appl. No.: 14/748,542

(22) Filed: Jun. 24, 2015

(65) Prior Publication Data

US 2015/0296146 A1 Oct. 15, 2015

Related U.S. Application Data

(63) Continuation of application No. PCT/US2013/077887, filed on Dec. 26, 2013, which
(Continued)

(51) Int. Cl.
*H04N 7/18* (2006.01)
*H04N 5/247* (2006.01)
(Continued)

(52) U.S. Cl.
CPC ......... *H04N 5/247* (2013.01); *H04N 5/23241* (2013.01); *H04N 5/265* (2013.01); *H04N 5/332* (2013.01); *H04N 7/181* (2013.01)

(58) Field of Classification Search
CPC ........ H04N 5/247; H04N 5/332; H04N 7/181; H04N 5/265; H04N 5/23241
(Continued)

(56) References Cited

U.S. PATENT DOCUMENTS

| | | | |
|---|---|---|---|
| 2,764,055 A | 9/1956 | Clemens et al. | |
| 4,608,598 A | 8/1986 | Murakami et al. | |

(Continued)

FOREIGN PATENT DOCUMENTS

| | | |
|---|---|---|
| CA | 2764055 | 7/2012 |
| CN | 2874947 | 2/2007 |

(Continued)

OTHER PUBLICATIONS

DARPA, "Broad Agency Announcement Low Cost Thermal Imager Manufacturing (LCTI-M)", Microsystems Technology Office, DARPA-BAA-11-27, Jan. 24, 2011. pp. 1-42, Arlington, VA.

*Primary Examiner* — Jayanti K Patel
*Assistant Examiner* — Richard B Carter
(74) *Attorney, Agent, or Firm* — Haynes and Boone, LLP

(57) ABSTRACT

Various techniques are provided to monitor electrical equipment. In some implementations, a monitoring system for a cabinet may include an infrared camera and a non-thermal camera. The infrared camera may be configured to capture one or more thermal images of at least a portion of electrical equipment positioned in an interior cavity of the cabinet. The non-thermal camera may be configured to capture one or more non-thermal images such as visible light images of the portion of electrical equipment. In some implementations, combined images may be generated that include characteristics of the thermal images and the non-thermal images for viewing by a user. In some implementations, the cameras may receive electrical power through a physical coupling to an electrical connector within the cabinet and/or
(Continued)

through electromagnetic energy harvesting techniques. Other implementations are also provided.

20 Claims, 18 Drawing Sheets

Related U.S. Application Data is a continuation-in-part of application No. PCT/US2013/035149, filed on Apr. 3, 2013, and a continuation-in-part of application No. 13/839,118, filed on Mar. 15, 2013, now Pat. No. 9,706,137, and a continuation-in-part of application No. 14/101,245, filed on Dec. 9, 2013, now Pat. No. 9,706,139, application No. 14/748,542, which is a continuation-in-part of application No. 14/101,245, filed on Dec. 9, 2013, now Pat. No. 9,706,139, which is a continuation of application No. PCT/US2012/041744, filed on Jun. 8, 2012, said application No. 13/839,118 is a continuation-in-part of application No. PCT/US2012/041744, filed on Jun. 8, 2012, said application No. PCT/US2013/035149 is a continuation-in-part of application No. PCT/US2012/041744, filed on Jun. 8, 2012, said application No. PCT/US2013/077887 is a continuation-in-part of application No. 14/099,818, filed on Dec. 6, 2013, now Pat. No. 9,723,227, application No. 14/748,542, which is a continuation-in-part of application No. 14/099,818, filed on Dec. 6, 2013, now Pat. No. 9,723,227, which is a continuation of application No. PCT/US2012/041749, filed on Jun. 8, 2012, said application No. 13/839,118 is a continuation-in-part of application No. PCT/US2012/041749, filed on Jun. 8, 2012, said application No. PCT/US2013/035149 is a continuation-in-part of application No. PCT/US2012/041749, filed on Jun. 8, 2012, said application No. PCT/US2013/077887 is a continuation-in-part of application No. 14/101,258, filed on Dec. 9, 2013, now Pat. No. 9,723,228, application No. 14/748,542, which is a continuation-in-part of application No. 14/101,258, filed on Dec. 9, 2013, now Pat. No. 9,723,228, which is a continuation of application No. PCT/US2012/041739, filed on Jun. 8, 2012, said application No. 13/839,118 is a continuation-in-part of application No. PCT/US2012/041739, filed on Jun. 8, 2012, said application No. PCT/US2013/077887 is a continuation-in-part of application No. 14/138,058, filed on Dec. 21, 2013, now Pat. No. 10,244,190, application No. 14/748,542, which is a continuation-in-part of application No. 14/138,058, filed on Dec. 21, 2013, now Pat. No. 10,244,190, said application No. PCT/US2013/077887 is a continuation-in-part of application No. 14/138,040, filed on Dec. 21, 2013, now Pat. No. 9,451,183, application No. 14/748,542, which is a continuation-in-part of application No. 14/138,040, filed on Dec. 21, 2013, now Pat. No. 9,451,183, said application No. PCT/US2013/077887 is a continuation-in-part of application No. 14/138,052, filed on Dec. 21, 2013, now Pat. No. 9,635,285, application No. 14/748,542, which is a continuation-in-part of application No. 14/138,052, filed on Dec. 21, 2013, now Pat. No. 9,635,285.

(60) Provisional application No. 61/882,546, filed on Sep. 25, 2013, provisional application No. 61/621,385, filed on Apr. 6, 2012, provisional application No. 61/656,889, filed on Jun. 7, 2012, provisional application No. 61/545,056, filed on Oct. 7, 2011, provisional application No. 61/495,873, filed on Jun. 10, 2011, provisional application No. 61/495,879, filed on Jun. 10, 2011, provisional application No. 61/495,888, filed on Jun. 10, 2011, provisional application No. 61/748,018, filed on Dec. 31, 2012, provisional application No. 61/792,582, filed on Mar. 15, 2013, provisional application No. 61/746,069, filed on Dec. 26, 2012, provisional application No. 61/793,952, filed on Mar. 15, 2013, provisional application No. 61/746,074, filed on Dec. 26, 2012.

(51) Int. Cl.
*H04N 5/33* (2006.01)
*H04N 5/232* (2006.01)
*H04N 5/265* (2006.01)

(58) Field of Classification Search
USPC ............ 348/92, 143, 222.1; 361/694, 837; 250/334; 290/1 R; 382/159
See application file for complete search history.

(56) References Cited

U.S. PATENT DOCUMENTS

| | | | |
|---|---|---|---|
| 5,138,522 A * | 8/1992 | Kojima | H02B 1/565 361/694 |
| 6,297,794 B1 | 10/2001 | Tsubouchi et al. | |
| 6,330,371 B1 | 12/2001 | Chen et al. | |
| 6,348,951 B1 | 2/2002 | Kim | |
| 6,396,543 B1 | 5/2002 | Shin et al. | |
| 6,424,843 B1 | 7/2002 | Reitmaa et al. | |
| 6,633,231 B1 | 10/2003 | Okamoto et al. | |
| 6,681,120 B1 | 1/2004 | Kim, II | |
| 6,759,949 B2 | 7/2004 | Miyahara | |
| 6,883,054 B2 | 4/2005 | Yamaguchi et al. | |
| 6,911,652 B2 | 6/2005 | Walkenstein | |
| 7,050,107 B1 | 5/2006 | Frank et al. | |
| D524,785 S | 7/2006 | Huang | |
| 7,084,857 B2 | 8/2006 | Lieberman et al. | |
| 7,208,733 B2 | 4/2007 | Mian et al. | |
| 7,263,379 B1 | 8/2007 | Parkulo et al. | |
| 7,284,921 B2 | 10/2007 | Lapstun et al. | |
| 7,296,747 B2 | 11/2007 | Rohs | |
| 7,305,368 B2 | 12/2007 | Lieberman et al. | |
| 7,321,783 B2 | 1/2008 | Kim, II | |
| 7,333,832 B2 | 2/2008 | Tsai et al. | |
| 7,377,835 B2 | 5/2008 | Parkulo et al. | |
| 7,420,663 B2 | 9/2008 | Wang et al. | |
| 7,453,064 B2 | 11/2008 | Lee | |
| 7,477,309 B2 | 1/2009 | Cuccias | |
| 7,567,818 B2 | 7/2009 | Pylkko | |
| 7,572,077 B2 | 8/2009 | Lapstun et al. | |
| 7,575,077 B2 | 8/2009 | Priepke et al. | |
| 7,595,904 B2 | 9/2009 | Lapstun et al. | |
| 7,616,877 B2 | 11/2009 | Zarnowski et al. | |
| 7,627,364 B2 | 12/2009 | Sato | |
| 7,697,962 B2 | 4/2010 | Cradick et al. | |
| 7,723,686 B2 | 5/2010 | Hannebauer | |
| 7,725,141 B2 | 5/2010 | Su | |
| 7,728,281 B2 | 6/2010 | Chen | |
| 7,735,974 B2 | 6/2010 | Silverbrook et al. | |
| 7,747,454 B2 | 6/2010 | Bartfeld et al. | |
| 7,760,919 B2 | 7/2010 | Namgoong | |
| 7,761,114 B2 | 7/2010 | Silverbrook et al. | |
| 7,773,870 B2 | 8/2010 | Naruse | |
| 7,801,733 B2 | 9/2010 | Lee et al. | |
| 7,810,733 B2 | 10/2010 | Silverbrook et al. | |
| 7,872,574 B2 | 1/2011 | Betts et al. | |
| 7,900,842 B2 | 3/2011 | Silverbrook et al. | |
| 7,903,152 B2 | 3/2011 | Kim, II | |
| 7,947,222 B2 | 5/2011 | Bae et al. | |
| 7,960,700 B2 | 6/2011 | Craig et al. | |

(56) References Cited

U.S. PATENT DOCUMENTS

| | | |
|---|---|---|
| 8,275,413 B1 | 9/2012 | Fraden et al. |
| 8,305,577 B2 | 11/2012 | Kivioja et al. |
| 8,345,226 B2 | 1/2013 | Zhang |
| 8,537,343 B2 | 9/2013 | Zhang |
| 8,781,420 B2 | 7/2014 | Schlub et al. |
| 8,825,112 B1 | 9/2014 | Fraden et al. |
| 2002/0006337 A1 | 1/2002 | Kimura et al. |
| 2002/0058352 A1 | 5/2002 | Jacksen et al. |
| 2002/0079450 A1 | 6/2002 | Wood |
| 2002/0122036 A1 | 9/2002 | Sasaki |
| 2002/0135571 A1 | 9/2002 | Klocek et al. |
| 2002/0140542 A1 | 10/2002 | Prokoski et al. |
| 2002/0149600 A1 | 10/2002 | Van Splunter et al. |
| 2003/0007193 A1 | 1/2003 | Sato et al. |
| 2003/0112871 A1 | 6/2003 | Demos |
| 2003/0122957 A1 | 7/2003 | Emme |
| 2003/0223623 A1 | 12/2003 | Gutta et al. |
| 2004/0047518 A1 | 3/2004 | Tiana |
| 2004/0101298 A1 | 5/2004 | Mandelbaum et al. |
| 2004/0109415 A1 | 6/2004 | Zansky et al. |
| 2004/0127156 A1 | 7/2004 | Park |
| 2004/0128070 A1 | 7/2004 | Schmidt et al. |
| 2004/0157612 A1 | 8/2004 | Kim, II |
| 2004/0165788 A1 | 8/2004 | Perez et al. |
| 2004/0169860 A1 | 9/2004 | Jung et al. |
| 2004/0207036 A1 | 10/2004 | Ikeda |
| 2004/0256561 A1 | 12/2004 | Beuhler et al. |
| 2005/0030314 A1 | 2/2005 | Dawson |
| 2005/0067852 A1 | 3/2005 | Jeong |
| 2005/0089241 A1 | 4/2005 | Kawanishi et al. |
| 2005/0068333 A1 | 5/2005 | Nakahashi et al. |
| 2005/0093890 A1 | 5/2005 | Baudisch |
| 2005/0110803 A1 | 5/2005 | Sugimura |
| 2005/0138569 A1 | 6/2005 | Baxter et al. |
| 2005/0169655 A1 | 8/2005 | Koyama et al. |
| 2005/0184993 A1 | 8/2005 | Ludwin et al. |
| 2005/0213813 A1 | 9/2005 | Lin et al. |
| 2005/0213853 A1 | 9/2005 | Maier et al. |
| 2005/0219249 A1 | 10/2005 | Xie et al. |
| 2005/0248912 A1 | 11/2005 | Kang et al. |
| 2005/0265688 A1 | 12/2005 | Kobayashi |
| 2005/0270784 A1 | 12/2005 | Hahn et al. |
| 2005/0277447 A1 | 12/2005 | Buil et al. |
| 2005/0281456 A1* | 12/2005 | Garvey ............... G01N 25/72 382/159 |
| 2006/0039686 A1 | 2/2006 | Soh et al. |
| 2006/0049906 A1 | 3/2006 | Liu et al. |
| 2006/0060984 A1 | 3/2006 | Wakabayashi et al. |
| 2006/0077246 A1 | 4/2006 | Kawakami et al. |
| 2006/0097172 A1 | 5/2006 | Park |
| 2006/0120712 A1 | 6/2006 | Kim |
| 2006/0132642 A1 | 6/2006 | Hosaka et al. |
| 2006/0140501 A1 | 6/2006 | Tadas |
| 2006/0147191 A1 | 7/2006 | Kim |
| 2006/0154559 A1 | 7/2006 | Yoshida |
| 2006/0158152 A1 | 7/2006 | Taniguchi et al. |
| 2006/0170217 A1 | 8/2006 | Kugel |
| 2006/0210249 A1 | 9/2006 | Seto |
| 2006/0234744 A1 | 10/2006 | Sung et al. |
| 2006/0240867 A1 | 10/2006 | Wang et al. |
| 2006/0266942 A1 | 11/2006 | Ikeda |
| 2006/0279758 A1 | 12/2006 | Myoki |
| 2006/0285907 A1 | 12/2006 | Kang et al. |
| 2007/0004449 A1 | 1/2007 | Sham |
| 2007/0019077 A1 | 1/2007 | Park |
| 2007/0019099 A1 | 1/2007 | Lieberman et al. |
| 2007/0019103 A1 | 1/2007 | Lieberman et al. |
| 2007/0033309 A1 | 2/2007 | Kuwabara et al. |
| 2007/0034800 A1 | 2/2007 | Huang |
| 2007/0052616 A1 | 3/2007 | Yoon |
| 2007/0057764 A1 | 3/2007 | Sato et al. |
| 2007/0103479 A1 | 5/2007 | Kim et al. |
| 2007/0120879 A1 | 5/2007 | Kanade et al. |
| 2007/0132858 A1 | 6/2007 | Chiba et al. |
| 2007/0139739 A1 | 6/2007 | Kim et al. |
| 2007/0159524 A1 | 7/2007 | Kim et al. |
| 2007/0189583 A1 | 8/2007 | Shimada et al. |
| 2007/0211965 A1 | 9/2007 | Helbing et al. |
| 2007/0222798 A1 | 9/2007 | Kuno |
| 2007/0248284 A1 | 10/2007 | Bernsen et al. |
| 2007/0274541 A1 | 11/2007 | Uetake et al. |
| 2007/0285439 A1 | 12/2007 | King et al. |
| 2007/0286517 A1 | 12/2007 | Paik et al. |
| 2007/0299226 A1 | 12/2007 | Park et al. |
| 2008/0038579 A1 | 2/2008 | Schuisky et al. |
| 2008/0056612 A1 | 3/2008 | Park et al. |
| 2008/0079834 A1 | 4/2008 | Chung et al. |
| 2008/0112012 A1 | 5/2008 | Yokoyama et al. |
| 2008/0151056 A1 | 6/2008 | Ahamefula |
| 2008/0165190 A1 | 7/2008 | Min et al. |
| 2008/0165342 A1 | 7/2008 | Yoshida et al. |
| 2008/0170082 A1 | 7/2008 | Kim |
| 2008/0218474 A1 | 9/2008 | Ahn et al. |
| 2008/0248833 A1 | 10/2008 | Silverbrook et al. |
| 2008/0259181 A1 | 10/2008 | Yamashita et al. |
| 2008/0266079 A1 | 10/2008 | Lontka |
| 2008/0278772 A1 | 11/2008 | Silverbrook et al. |
| 2008/0284880 A1 | 11/2008 | Numata |
| 2008/0292144 A1 | 11/2008 | Kim |
| 2008/0297614 A1 | 12/2008 | Lieberman et al. |
| 2009/0023421 A1 | 1/2009 | Parkulo et al. |
| 2009/0027525 A1 | 1/2009 | Lin et al. |
| 2009/0040042 A1 | 2/2009 | Lontka |
| 2009/0040195 A1 | 2/2009 | Njolstad et al. |
| 2009/0050806 A1 | 2/2009 | Schmidt et al. |
| 2009/0052883 A1 | 2/2009 | Lee et al. |
| 2009/0129700 A1 | 5/2009 | Rother et al. |
| 2009/0131104 A1 | 5/2009 | Yoon |
| 2009/0027061 A1 | 6/2009 | Curt et al. |
| 2009/0148019 A1 | 6/2009 | Hamada et al. |
| 2009/0213110 A1 | 8/2009 | Kato et al. |
| 2009/0215479 A1 | 8/2009 | Karmarkar |
| 2009/0227287 A1 | 9/2009 | Kotidis |
| 2009/0238238 A1 | 9/2009 | Hollander et al. |
| 2009/0278048 A1 | 11/2009 | Choe et al. |
| 2009/0297062 A1 | 12/2009 | Molne et al. |
| 2009/0303363 A1 | 12/2009 | Blessinger |
| 2010/0020229 A1 | 1/2010 | Hershey et al. |
| 2010/0044567 A1* | 2/2010 | Brandt ............... G01J 5/0096 250/334 |
| 2010/0045809 A1* | 2/2010 | Packard ............... H04N 5/2258 348/222.1 |
| 2010/0066809 A1 | 3/2010 | Cormack et al. |
| 2010/0066866 A1 | 3/2010 | Lim |
| 2010/0079973 A1* | 4/2010 | Brandt ............... H01H 9/04 361/837 |
| 2010/0090965 A1 | 4/2010 | Birkler |
| 2010/0090983 A1 | 4/2010 | Challener et al. |
| 2010/0103141 A1 | 4/2010 | Challener et al. |
| 2010/0113068 A1 | 5/2010 | Rothschild |
| 2010/0131268 A1 | 5/2010 | Moeller |
| 2010/0139908 A1 | 6/2010 | Slessman |
| 2010/0144387 A1 | 6/2010 | Chou |
| 2010/0163730 A1 | 7/2010 | Schmidt et al. |
| 2010/0231396 A1 | 9/2010 | Tump |
| 2010/0234067 A1 | 9/2010 | Silverbrook et al. |
| 2010/0245582 A1 | 9/2010 | Harel |
| 2010/0245585 A1 | 9/2010 | Fisher et al. |
| 2010/0245826 A1 | 9/2010 | Lee |
| 2010/0314543 A1 | 12/2010 | Lee et al. |
| 2010/0314947 A1 | 12/2010 | Baarman et al. |
| 2011/0043486 A1 | 2/2011 | Hagiwara et al. |
| 2011/0063446 A1 | 3/2011 | McMordie et al. |
| 2011/0077719 A1 | 3/2011 | Rofougaran |
| 2011/0102599 A1 | 5/2011 | Kwon et al. |
| 2011/0117532 A1 | 5/2011 | Relyea et al. |
| 2011/0121978 A1 | 5/2011 | Schwörer et al. |
| 2011/0122075 A1 | 5/2011 | Seo et al. |
| 2011/0128384 A1 | 6/2011 | Tiscareno et al. |
| 2011/0133488 A1* | 6/2011 | Roberts ............... H02K 35/02 290/1 R |
| 2011/0254285 A1 | 10/2011 | Hanchett, Jr. |
| 2012/0007987 A1 | 1/2012 | Gaber |
| 2012/0013292 A1 | 1/2012 | Ali et al. |

(56) References Cited

U.S. PATENT DOCUMENTS

| | | | |
|---|---|---|---|
| 2012/0083314 A1 | 4/2012 | Ng et al. | |
| 2012/0184252 A1 | 7/2012 | Hirsch | |
| 2012/0199689 A1 | 8/2012 | Burkland | |
| 2012/0262584 A1 | 10/2012 | Strandemar | |
| 2012/0273688 A1 | 11/2012 | Tsai et al. | |
| 2012/0274814 A1 | 11/2012 | Wajs | |
| 2012/0276954 A1 | 11/2012 | Kowalsky | |
| 2012/0292518 A1 | 11/2012 | Goldstein | |
| 2012/0320086 A1 | 12/2012 | Kasama et al. | |
| 2013/0202292 A1 | 8/2013 | Sokolov et al. | |
| 2013/0204570 A1 | 8/2013 | Mendelson et al. | |
| 2013/0250102 A1* | 9/2013 | Scanlon | H04N 5/33 348/143 |
| 2013/0320220 A1 | 12/2013 | Donowsky | |
| 2014/0253735 A1* | 9/2014 | Fox | H04N 5/2252 348/164 |

FOREIGN PATENT DOCUMENTS

| | | |
|---|---|---|
| CN | 2899321 | 5/2007 |
| CN | 201203922 | 3/2009 |
| CN | 101635754 | 1/2010 |
| CN | 201481406 | 5/2010 |
| CN | 201550169 | 8/2010 |
| CN | 101859209 | 10/2010 |
| CN | 201628839 | 11/2010 |
| CN | 101945154 | 1/2011 |
| CN | 102045423 | 5/2011 |
| CN | 102045448 | 5/2011 |
| CN | 102055836 | 5/2011 |
| CN | 201869255 | 6/2011 |
| CN | 201897853 | 7/2011 |
| CN | 102178510 | 9/2011 |
| CN | 202261481 | 5/2012 |
| CN | 102880289 | 1/2013 |
| CN | 202998279 | 6/2013 |
| DE | 102006057431 | 6/2008 |
| EP | 1 983 485 | 10/2008 |
| EP | 2 136 554 | 12/2009 |
| EP | 2477391 | 7/2012 |
| JP | 1997275518 | 4/1999 |
| JP | 2004 004465 | 1/2004 |
| JP | 2004048571 | 2/2004 |
| JP | 2004 241491 | 8/2004 |
| JP | 2006098098 | 4/2006 |
| JP | 2006105655 | 4/2006 |
| JP | 2007006475 | 1/2007 |
| JP | 2007 267035 | 10/2007 |
| JP | 2007325842 | 12/2007 |
| JP | 2010181324 | 8/2010 |
| JP | 2012231309 | 11/2012 |
| KR | 20000026757 | 5/2000 |
| KR | 100227582 | 11/2000 |
| KR | 100272582 | 11/2000 |
| KR | 20000073381 | 12/2000 |
| KR | 100285817 | 1/2001 |
| KR | 20010001341 | 1/2001 |
| KR | 20010002462 | 1/2001 |
| KR | 20010010010 | 2/2001 |
| KR | 20010014992 | 2/2001 |
| KR | 20010044756 | 6/2001 |
| KR | 20010050263 | 6/2001 |
| KR | 20010060752 | 7/2001 |
| KR | 20010068202 | 7/2001 |
| KR | 20010070355 | 7/2001 |
| KR | 20010074565 | 8/2001 |
| KR | 20020006967 | 1/2002 |
| KR | 20020044339 | 6/2002 |
| KR | 20020049605 | 6/2002 |
| KR | 20020061406 | 7/2002 |
| KR | 20020061920 | 7/2002 |
| KR | 20020069690 | 9/2002 |
| KR | 20020078469 | 10/2002 |
| KR | 20020083368 | 11/2002 |
| KR | 20020083961 | 11/2002 |
| KR | 20020085124 | 11/2002 |
| KR | 20020085490 | 11/2002 |
| KR | 20020095752 | 12/2002 |
| KR | 20030000332 | 1/2003 |
| KR | 20030007030 | 1/2003 |
| KR | 20030012444 | 2/2003 |
| KR | 20030016607 | 3/2003 |
| KR | 20030024545 | 3/2003 |
| KR | 20030037101 | 5/2003 |
| KR | 20030051140 | 6/2003 |
| KR | 20030055693 | 7/2003 |
| KR | 20030056667 | 7/2003 |
| KR | 20030067116 | 8/2003 |
| KR | 20030085742 | 11/2003 |
| KR | 20030088968 | 11/2003 |
| KR | 20040001684 | 1/2004 |
| KR | 20040001686 | 1/2004 |
| KR | 20040023826 | 3/2004 |
| KR | 20040027692 | 4/2004 |
| KR | 20040033223 | 4/2004 |
| KR | 20040033532 | 4/2004 |
| KR | 20040033986 | 4/2004 |
| KR | 20040033993 | 4/2004 |
| KR | 20040039868 | 5/2004 |
| KR | 20040040296 | 5/2004 |
| KR | 20040042475 | 5/2004 |
| KR | 20040044624 | 5/2004 |
| KR | 100437890 | 6/2004 |
| KR | 20040054416 | 6/2004 |
| KR | 20040058969 | 7/2004 |
| KR | 20040062802 | 7/2004 |
| KR | 20040064855 | 7/2004 |
| KR | 20040066724 | 7/2004 |
| KR | 20040068864 | 8/2004 |
| KR | 20040070840 | 8/2004 |
| KR | 20040076308 | 9/2004 |
| KR | 20040086994 | 10/2004 |
| KR | 20040102386 | 12/2004 |
| KR | 20050008245 | 1/2005 |
| KR | 20050011313 | 1/2005 |
| KR | 20050012505 | 2/2005 |
| KR | 20050014448 | 2/2005 |
| KR | 20050015293 | 2/2005 |
| KR | 20050015526 | 2/2005 |
| KR | 20050015745 | 2/2005 |
| KR | 20050018370 | 2/2005 |
| KR | 20050023950 | 3/2005 |
| KR | 20050028537 | 3/2005 |
| KR | 20050033308 | 4/2005 |
| KR | 101006660 | 9/2005 |
| KR | 1020050095463 | 9/2005 |
| KR | 100547739 | 1/2006 |
| KR | 20060023957 | 3/2006 |
| KR | 1020060019715 | 3/2006 |
| KR | 100645746 | 5/2006 |
| KR | 20060054877 | 5/2006 |
| KR | 20060071220 | 6/2006 |
| KR | 100612890 | 8/2006 |
| KR | 100633792 | 10/2006 |
| KR | 100646966 | 11/2006 |
| KR | 20060119077 | 11/2006 |
| KR | 20060119236 | 11/2006 |
| KR | 20060120318 | 11/2006 |
| KR | 20060121595 | 11/2006 |
| KR | 100660125 | 12/2006 |
| KR | 100663528 | 1/2007 |
| KR | 100672377 | 1/2007 |
| KR | 20070002590 | 1/2007 |
| KR | 20070005263 | 1/2007 |
| KR | 20070005553 | 1/2007 |
| KR | 20070009380 | 1/2007 |
| KR | 100677913 | 2/2007 |
| KR | 100689465 | 3/2007 |
| KR | 20070028201 | 3/2007 |
| KR | 100722974 | 5/2007 |
| KR | 100729813 | 6/2007 |
| KR | 20070067650 | 6/2007 |
| KR | 100743171 | 7/2007 |

(56) References Cited

FOREIGN PATENT DOCUMENTS

| | | |
|---|---|---|
| KR | 100743254 | 7/2007 |
| KR | 20070068501 | 7/2007 |
| KR | 20070078477 | 8/2007 |
| KR | 20070082960 | 8/2007 |
| KR | 20070087513 | 8/2007 |
| KR | 20070091486 | 9/2007 |
| KR | 100766953 | 10/2007 |
| KR | 100771364 | 10/2007 |
| KR | 20070104957 | 10/2007 |
| KR | 100777428 | 11/2007 |
| KR | 20070115754 | 12/2007 |
| KR | 20070122344 | 12/2007 |
| KR | 20070122345 | 12/2007 |
| KR | 100802525 | 2/2008 |
| KR | 20080013314 | 2/2008 |
| KR | 20080015099 | 2/2008 |
| KR | 20080015100 | 2/2008 |
| KR | 20080015973 | 2/2008 |
| KR | 20080018407 | 2/2008 |
| KR | 100822053 | 4/2008 |
| KR | 20080045551 | 5/2008 |
| KR | 100841243 | 6/2008 |
| KR | 20080053057 | 6/2008 |
| KR | 20080054596 | 6/2008 |
| KR | 100846192 | 7/2008 |
| KR | 20080059882 | 7/2008 |
| KR | 20080069007 | 7/2008 |
| KR | 100854932 | 8/2008 |
| KR | 20080071070 | 8/2008 |
| KR | 20080078315 | 8/2008 |
| KR | 100866177 | 10/2008 |
| KR | 100866475 | 11/2008 |
| KR | 100866476 | 11/2008 |
| KR | 100866573 | 11/2008 |
| KR | 100870724 | 11/2008 |
| KR | 20080096918 | 11/2008 |
| KR | 20080098409 | 11/2008 |
| KR | 100871916 | 12/2008 |
| KR | 20080112331 | 12/2008 |
| KR | 20090003899 | 1/2009 |
| KR | 20090018486 | 2/2009 |
| KR | 20090020864 | 2/2009 |
| KR | 100888554 | 3/2009 |
| KR | 20090036734 | 4/2009 |
| KR | 100897170 | 5/2009 |
| KR | 20090052526 | 5/2009 |
| KR | 100901784 | 6/2009 |
| KR | 100903348 | 6/2009 |
| KR | 20090089931 | 8/2009 |
| KR | 100922497 | 10/2009 |
| KR | 20090105424 | 10/2009 |
| KR | 100932752 | 12/2009 |
| KR | 100935495 | 1/2010 |
| KR | 20100006652 | 1/2010 |
| KR | 2010022327 | 3/2010 |
| KR | 20100039170 | 4/2010 |
| KR | 100958030 | 5/2010 |
| KR | 20100059681 | 6/2010 |
| KR | 20100070116 | 6/2010 |
| KR | 20100070119 | 6/2010 |
| KR | 20100072994 | 7/2010 |
| KR | 100977516 | 8/2010 |
| KR | 2010091758 | 8/2010 |
| KR | 20100089125 | 8/2010 |
| KR | 20100090521 | 8/2010 |
| KR | 20100091758 | 8/2010 |
| KR | 20100098958 | 9/2010 |
| KR | 100985816 | 10/2010 |
| KR | 100990904 | 11/2010 |
| KR | 20100123021 | 11/2010 |
| KR | 20110006437 | 1/2011 |
| KR | 20110011264 | 2/2011 |
| KR | 2011024290 | 3/2011 |
| KR | 20110019994 | 3/2011 |
| KR | 101111167 | 4/2011 |
| KR | 1111167 | 2/2012 |
| KR | 1020130142810 | 12/2013 |
| TW | 201116030 | 5/2011 |
| WO | WO 00/23814 | 4/2000 |
| WO | WO 03/093963 | 11/2003 |
| WO | WO 2005/002228 | 1/2005 |
| WO | WO 2005/088846 | 9/2005 |
| WO | WO 2006/112866 | 10/2006 |
| WO | WO 2007/006242 | 1/2007 |
| WO | WO 2009/122114 | 10/2009 |
| WO | WO 2010/005152 | 1/2010 |
| WO | WO 2010/033142 | 3/2010 |
| WO | WO 2012/170949 | 12/2012 |

\* cited by examiner

ELECTRICAL CABINET INFRARED MONITOR SYSTEMS AND METHODS

CROSS-REFERENCE TO RELATED APPLICATIONS

This application is a continuation of International Patent Application No. PCT/US2013/077887 filed Dec. 26, 2013 and entitled "ELECTRICAL CABINET INFRARED MONITOR SYSTEMS AND METHODS" which is hereby incorporated by reference in its entirety.

International Patent Application No. PCT/US2013/077887 claims the benefit of U.S. Provisional Patent Application No. 61/882,546 filed Sep. 25, 2013 and entitled "ELECTRICAL CABINET INFRARED MONITOR SYSTEMS AND METHODS" which is hereby incorporated by reference in its entirety.

International Patent Application No. PCT/US2013/077887 is a continuation-in-part of International Patent Application No. PCT/US2013/35149 filed Apr. 3, 2013 and entitled "ELECTRICAL CABINET INFRARED MONITOR" which is hereby incorporated by reference in its entirety.

International Patent Application No. PCT/US2013/077887 is a continuation-in-part of U.S. patent application Ser. No. 13/839,118 filed Mar. 15, 2013 and entitled "ELECTRICAL CABINET INFRARED MONITOR" which is hereby incorporated by reference in its entirety.

U.S. patent application Ser. No. 13/839,118 claims the benefit of U.S. Provisional Patent Application No. 61/621,385 filed Apr. 6, 2012 and entitled "ELECTRICAL CABINET INFRARED MONITOR" which is hereby incorporated by reference in its entirety.

International Patent Application No. PCT/US2013/35149 claims the benefit of U.S. Provisional Patent Application No. 61/621,385 filed Apr. 6, 2012 and entitled "ELECTRICAL CABINET INFRARED MONITOR" which is hereby incorporated by reference in its entirety.

International Patent Application No. PCT/US2013/077887 is a continuation-in-part of U.S. patent application Ser. No. 14/101,245 filed Dec. 9, 2013 and entitled "LOW POWER AND SMALL FORM FACTOR INFRARED IMAGING" which is hereby incorporated by reference in its entirety.

This application is a continuation-in-part of U.S. patent application Ser. No. 14/101,245 filed Dec. 9, 2013 and entitled "LOW POWER AND SMALL FORM FACTOR INFRARED IMAGING" which is hereby incorporated by reference in its entirety.

U.S. patent application Ser. No. 14/101,245 is a continuation of International Patent Application No. PCT/US2012/041744 filed Jun. 8, 2012 and entitled "LOW POWER AND SMALL FORM FACTOR INFRARED IMAGING" which is hereby incorporated by reference in its entirety.

U.S. patent application Ser. No. 13/839,118 is a continuation-in-part of International Patent Application No. PCT/US2012/041744 filed Jun. 8, 2012 and entitled "LOW POWER AND SMALL FORM FACTOR INFRARED IMAGING" which is hereby incorporated by reference in its entirety.

International Patent Application No. PCT/US2013/35149 is a continuation-in-part of International Patent Application No. PCT/US2012/041744 filed Jun. 8, 2012 and entitled "LOW POWER AND SMALL FORM FACTOR INFRARED IMAGING" which is hereby incorporated by reference in its entirety.

International Patent Application No. PCT/US2012/041744 claims the benefit of U.S. Provisional Patent Application No. 61/656,889 filed Jun. 7, 2012 and entitled "LOW POWER AND SMALL FORM FACTOR INFRARED IMAGING" which is hereby incorporated by reference in its entirety.

International Patent Application No. PCT/US2012/041744 claims the benefit of U.S. Provisional Patent Application No. 61/545,056 filed Oct. 7, 2011 and entitled "NON-UNIFORMITY CORRECTION TECHNIQUES FOR INFRARED IMAGING DEVICES" which is hereby incorporated by reference in its entirety.

International Patent Application No. PCT/US2012/041744 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041744 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041744 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

International Patent Application No. PCT/US2013/077887 is a continuation-in-part of U.S. patent application Ser. No. 14/099,818 filed Dec. 6, 2013 and entitled "NON-UNIFORMITY CORRECTION TECHNIQUES FOR INFRARED IMAGING DEVICES" which is hereby incorporated by reference in its entirety.

This application is a continuation-in-part of U.S. patent application Ser. No. 14/099,818 filed Dec. 6, 2013 and entitled "NON-UNIFORMITY CORRECTION TECHNIQUES FOR INFRARED IMAGING DEVICES" which is hereby incorporated by reference in its entirety.

U.S. patent application Ser. No. 14/099,818 is a continuation of International Patent Application No. PCT/US2012/041749 filed Jun. 8, 2012 and entitled "NON-UNIFORMITY CORRECTION TECHNIQUES FOR INFRARED IMAGING DEVICES" which is hereby incorporated by reference in its entirety.

U.S. patent application Ser. No. 13/839,118 is a continuation-in-part of International Patent Application No. PCT/US2012/041749 filed Jun. 8, 2012 and entitled "NON-UNIFORMITY CORRECTION TECHNIQUES FOR INFRARED IMAGING DEVICES" which is hereby incorporated by reference in its entirety.

International Patent Application No. PCT/US2013/35149 is a continuation-in-part of International Patent Application No. PCT/US2012/041749 filed Jun. 8, 2012 and entitled "NON-UNIFORMITY CORRECTION TECHNIQUES FOR INFRARED IMAGING DEVICES" which is hereby incorporated by reference in its entirety.

International Patent Application No. PCT/US2012/041749 claims the benefit of U.S. Provisional Patent Application No. 61/545,056 filed Oct. 7, 2011 and entitled "NON-UNIFORMITY CORRECTION TECHNIQUES FOR INFRARED IMAGING DEVICES" which is hereby incorporated by reference in its entirety.

International Patent Application No. PCT/US2012/041749 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041749 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041749 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

International Patent Application No. PCT/US2013/077887 is a continuation-in-part of U.S. patent application Ser. No. 14/101,258 filed Dec. 9, 2013 and entitled "INFRARED CAMERA SYSTEM ARCHITECTURES" which is hereby incorporated by reference in its entirety.

This application is a continuation-in-part of U.S. patent application Ser. No. 14/101,258 filed Dec. 9, 2013 and entitled "INFRARED CAMERA SYSTEM ARCHITECTURES" which is hereby incorporated by reference in its entirety.

U.S. patent application Ser. No. 14/101,258 is a continuation of International Patent Application No. PCT/US2012/041739 filed Jun. 8, 2012 and entitled "INFRARED CAMERA SYSTEM ARCHITECTURES" which is hereby incorporated by reference in its entirety.

U.S. patent application Ser. No. 13/839,118 is a continuation-in-part of International Patent Application No. PCT/US2012/041739 filed Jun. 8, 2012 and entitled "INFRARED CAMERA SYSTEM ARCHITECTURES" which is hereby incorporated by reference in its entirety.

International Patent Application No. PCT/US2013/35149 is a continuation-in-part of International Patent Application No. PCT/US2012/041739 filed Jun. 8, 2012 and entitled "INFRARED CAMERA SYSTEM ARCHITECTURES" which is hereby incorporated by reference in its entirety.

International Patent Application No. PCT/US2012/041739 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041739 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041739 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

International Patent Application No. PCT/US2013/077887 is a continuation-in-part of U.S. patent application Ser. No. 14/138,058 filed Dec. 21, 2013 and entitled "COMPACT MULTI-SPECTRUM IMAGING WITH FUSION" which is hereby incorporated by reference in its entirety.

This application is a continuation-in-part of U.S. patent application Ser. No. 14/138,058 filed Dec. 21, 2013 and entitled "COMPACT MULTI-SPECTRUM IMAGING WITH FUSION" which is hereby incorporated by reference in its entirety.

U.S. patent application Ser. No. 14/138,058 claims the benefit of U.S. Provisional Patent Application No. 61/748,018 filed Dec. 31, 2012 and entitled "COMPACT MULTI-SPECTRUM IMAGING WITH FUSION" which is hereby incorporated by reference in its entirety.

International Patent Application No. PCT/US2013/077887 is a continuation-in-part of U.S. patent application Ser. No. 14/138,040 filed Dec. 21, 2013 and entitled "TIME SPACED INFRARED IMAGE ENHANCEMENT" which is hereby incorporated by reference in its entirety.

This application is a continuation-in-part of U.S. patent application Ser. No. 14/138,040 filed Dec. 21, 2013 and entitled "TIME SPACED INFRARED IMAGE ENHANCEMENT" which is hereby incorporated by reference in its entirety.

U.S. patent application Ser. No. 14/138,040 claims the benefit of U.S. Provisional Patent Application No. 61/792,582 filed Mar. 15, 2013 and entitled "TIME SPACED INFRARED IMAGE ENHANCEMENT" which is hereby incorporated by reference in its entirety.

U.S. patent application Ser. No. 14/138,040 also claims the benefit of U.S. Provisional Patent Application No. 61/746,069 filed Dec. 26, 2012 and entitled "TIME SPACED INFRARED IMAGE ENHANCEMENT" which is hereby incorporated by reference in its entirety.

International Patent Application No. PCT/US2013/077887 is a continuation-in-part of U.S. patent application Ser. No. 14/138,052 filed Dec. 21, 2013 and entitled "INFRARED IMAGING ENHANCEMENT WITH FUSION" which is hereby incorporated by reference in its entirety.

This application is a continuation-in-part of U.S. patent application Ser. No. 14/138,052 filed Dec. 21, 2013 and entitled "INFRARED IMAGING ENHANCEMENT WITH FUSION" which is hereby incorporated by reference in its entirety.

U.S. patent application Ser. No. 14/138,052 claims the benefit of U.S. Provisional Patent Application No. 61/793,952 filed Mar. 15, 2013 and entitled "INFRARED IMAGING ENHANCEMENT WITH FUSION" which is hereby incorporated by reference in its entirety.

U.S. patent application Ser. No. 14/138,052 also claims the benefit of U.S. Provisional Patent Application No. 61/746,074 filed Dec. 26, 2012 and entitled "INFRARED IMAGING ENHANCEMENT WITH FUSION" which is hereby incorporated by reference in its entirety.

TECHNICAL FIELD

This application relates to sensors, and more particularly to a camera monitoring system for electrical cabinets.

BACKGROUND

It is conventional for an electrical distribution system in industrial buildings, offices, and the like to include numerous enclosures (e.g., electrical cabinets) for housing electrical switchgear such as disconnects and circuit breakers. Inspection of the switchgear is essential for safety. For example, overheated switchgear is a prime cause of building fires. Thus, it is conventional to conduct regular inspections and maintenance for the electrical cabinets.

Inspection of electrical switchgear may involve looking for thermal hotspots using an infrared camera. But such inspection is a cumbersome process because the electrical power must typically be shut off for safety reasons before a cabinet can be opened. Accordingly, there is a need in the art for improved electrical cabinet thermal monitoring systems and techniques.

SUMMARY

In accordance with an aspect of the disclosure, a monitoring system for a cabinet includes: an infrared camera configured to capture thermal images of at least a portion of electrical equipment positioned in an interior cavity of the cabinet; and a communication interface configured to transmit the thermal images from the infrared camera for external viewing by a user.

In accordance with another aspect of the disclosure a method of monitoring an interior cavity of a cabinet includes: capturing, by an infrared camera, thermal images of at least a portion of electrical equipment positioned in the interior cavity of the cabinet; and transmitting, by a communication interface, the thermal images from the infrared camera for external viewing by a user.

In accordance with another aspect of the disclosure, a monitoring system for an electrical cabinet is provided that includes: an electromagnetic coupler for receiving electromagnetic energy from a conductor within the electrical cabinet; an energy harvesting circuit for harvesting electrical power from the electromagnetic coupler; a battery for storing the harvested electrical power and for powering the monitoring system; and an infrared camera configured to thermally image an interior of the electrical cabinet.

In accordance with another aspect of the disclosure, a method of monitoring an electrical cabinet is provided that includes: harvesting electromagnetic energy from at least one conductor within the electrical cabinet; storing the harvested electromagnetic energy in an energy storage device; thermally imaging an interior of the electrical cabinet as energized by the energy storage device; and wirelessly transmitting the thermal image to a remote system.

In accordance with another aspect of the disclosure, a system includes an infrared camera configured to capture a thermal image of at least a portion of electrical equipment positioned in an interior cavity of a cabinet; a non-thermal camera configured to capture a non-thermal image of at least the portion of the electrical equipment positioned in the interior cavity of the cabinet; and a communication interface configured to transmit the thermal image and the non-thermal image for external viewing by a user.

In accordance with another aspect of the disclosure, a method includes capturing, by an infrared camera, a thermal image of at least a portion of electrical equipment positioned in an interior cavity of a cabinet; capturing, by a non-thermal camera, a non-thermal image of at least the portion of the electrical equipment positioned in the interior cavity of the cabinet; and transmitting, by a communication interface, the thermal image and the non-thermal image for external viewing by a user.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Figure 1:
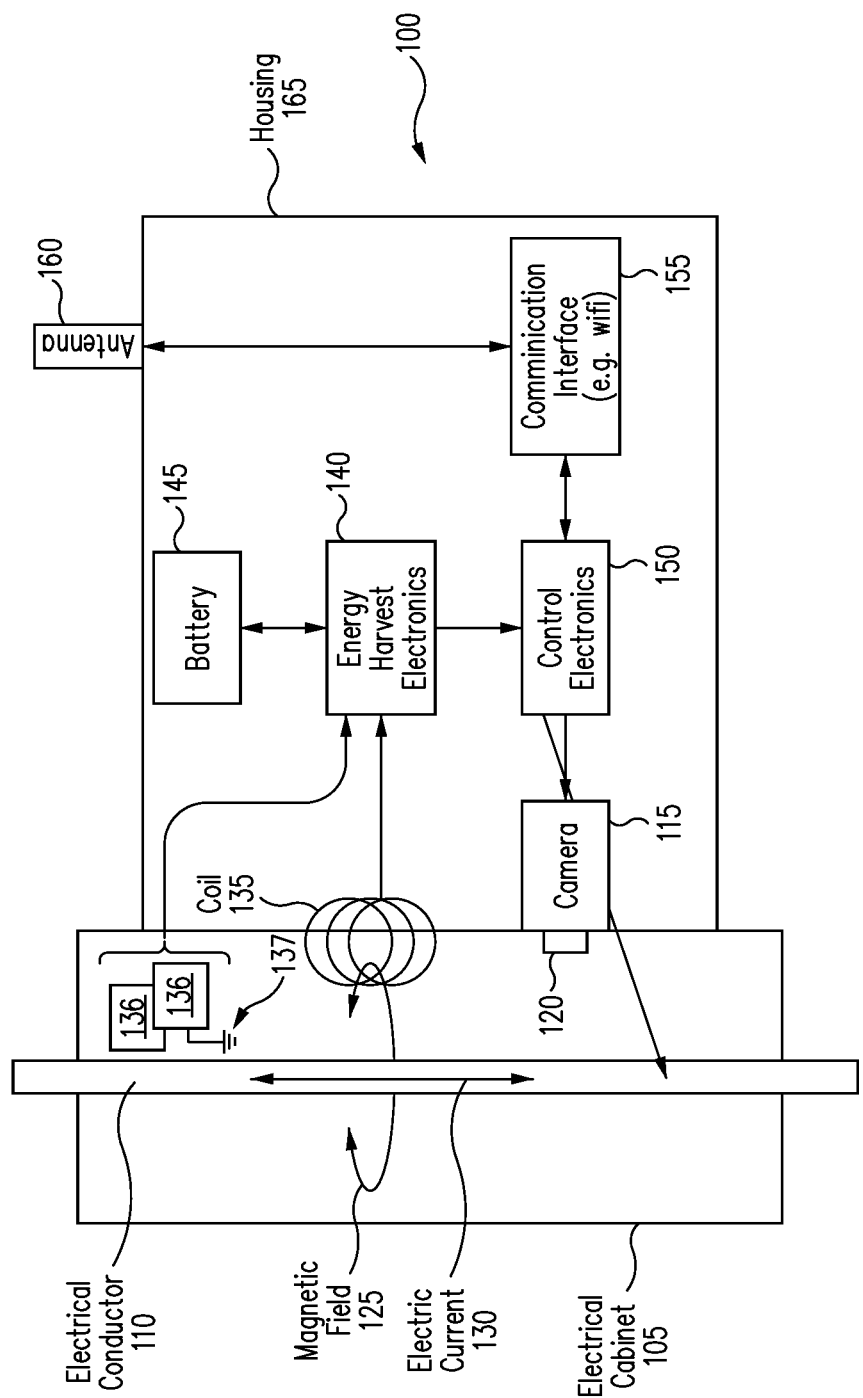
FIG. 1 illustrates an example monitoring system in accordance with an embodiment of the disclosure.

A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

DETAILED DESCRIPTION

To address the shortcomings in the thermal monitoring arts, an infrared camera is disclosed that is configured to be permanently integrated with an electrical cabinet. In this fashion, thermal monitoring may be performed continuously without requiring any electrical system shutdowns. To provide even greater convenience, the infrared camera may be powered through power scavenging techniques such that no battery replacement is necessary. In some embodiments, the infrared camera may be powered by physical electrical connections within the electrical cabinet in addition to, or as an alternative to, such power scavenging techniques. In some embodiments, multiple infrared cameras may be provided. In some embodiments non-thermal cameras may also be configured to be permanently integrated with the electrical cabinet. In some embodiments, the non-thermal cameras may be powered through power scavenging techniques such that no battery replacement is necessary. In some embodiments, infrared cameras and non-thermal cameras may be included in a common multi-spectrum camera package.

In some embodiments, one or more infrared (e.g., thermal) cameras and one or more non-thermal cameras (e.g., visible light cameras or other types of non-thermal imagers) may be provided to monitor an electrical cabinet. For example, an infrared camera and a non-thermal camera may be provided as small form factor imaging modules. The non-thermal camera may be implemented, for example, with one or more sensors and/or sensor arrays responsive to radiation in non-thermal spectrums (e.g., radiation in visible light wavelengths, ultraviolet wavelengths, and/or other non-thermal wavelengths). For example, in some embodiments, the non-thermal camera may be implemented with a charge-coupled device (CCD) sensor, an electron multiplying CCD (EMCCD) sensor, a complementary metal-oxide-semiconductor (CMOS) sensor, a scientific CMOS (sCMOS) sensor, or other filters and/or sensors.

In some embodiments, the non-thermal camera may be co-located with an infrared imaging module and oriented such that a field-of-view (FOV) of the non-thermal camera at least partially overlaps a FOV of the infrared imaging module. In one example, the infrared imaging module and a non-thermal camera may be implemented as a dual sensor module sharing a common substrate according to various techniques described in U.S. Provisional Patent Application No. 61/748,018 filed Dec. 31, 2012, which is incorporated herein by reference.

For embodiments having such a non-thermal light camera, various components (e.g., one or more processing components) may be configured to superimpose, fuse, blend, or otherwise combine infrared images (e.g., including thermal images) captured by the infrared imaging module and non-thermal images (e.g., including visible light images) captured by a non-thermal camera, whether captured at substantially the same time or different times (e.g., time-spaced over hours, days, daytime versus nighttime, and/or otherwise).

In some embodiments, thermal and non-thermal images may be processed to generate combined images (e.g., one or more processes performed on such images in some embodiments). For example, scene-based NUC processing may be performed (as further described herein), true color processing may be performed, and/or high contrast processing may be performed.

Regarding true color processing, thermal images may be blended with non-thermal images by, for example, blending a radiometric component of a thermal image with a corresponding component of a non-thermal image according to a blending parameter, which may be adjustable by a user and/or machine in some embodiments. For example, luminance or chrominance components of the thermal and non-thermal images may be combined according to the blending parameter. In one embodiment, such blending techniques may be referred to as true color infrared imagery. For example, in daytime imaging, a blended image may comprise a non-thermal color image, which includes a luminance component and a chrominance component, with its luminance value replaced and/or blended with the luminance value from a thermal image. The use of the luminance data from the thermal image causes the intensity of the true non-thermal color image to brighten or dim based on the temperature of the object. As such, these blending techniques provide thermal imaging for daytime or visible light images.

Regarding high contrast processing, high spatial frequency content may be obtained from one or more of the thermal and non-thermal images (e.g., by performing high pass filtering, difference imaging, and/or other techniques). A combined image may include a radiometric component of a thermal image and a blended component including infrared (e.g., thermal) characteristics of a scene blended with the high spatial frequency content, according to a blending parameter, which may be adjustable by a user and/or machine in some embodiments. In some embodiments, high spatial frequency content from non-thermal images may be blended with thermal images by superimposing the high spatial frequency content onto the thermal images, where the high spatial frequency content replaces or overwrites those portions of the thermal images corresponding to where the high spatial frequency content exists. For example, the high spatial frequency content may include edges of objects depicted in images of a scene, but may not exist within the interior of such objects. In such embodiments, blended image data may simply include the high spatial frequency content, which may subsequently be encoded into one or more components of combined images.

For example, a radiometric component of thermal image may be a chrominance component of the thermal image, and the high spatial frequency content may be derived from the luminance and/or chrominance components of a non-thermal image. In this embodiment, a combined image may include the radiometric component (e.g., the chrominance component of the thermal image) encoded into a chrominance component of the combined image and the high spatial frequency content directly encoded (e.g., as blended image data but with no thermal image contribution) into a luminance component of the combined image. By doing so, a radiometric calibration of the radiometric component of the thermal image may be retained. In similar embodiments, blended image data may include the high spatial frequency content added to a luminance component of the thermal images, and the resulting blended data encoded into a luminance component of resulting combined images.

For example, any of the techniques disclosed in the following applications may be used in various embodiments: U.S. patent application Ser. No. 12/477,828 filed Jun. 3, 2009; U.S. patent application Ser. No. 12/766,739 filed Apr. 23, 2010; U.S. patent application Ser. No. 13/105,765 filed May 11, 2011; U.S. patent application Ser. No. 13/437,645 filed Apr. 2, 2012; U.S. Provisional Patent Application No. 61/473,207 filed Apr. 8, 2011; U.S. Provisional Patent Application No. 61/746,069 filed Dec. 26, 2012; U.S. Provisional Patent Application No. 61/746,074 filed Dec. 26, 2012; U.S. Provisional Patent Application No. 61/748,018 filed Dec. 31, 2012; U.S. Provisional Patent Application No. 61/792,582 filed Mar. 15, 2013; U.S. Provisional Patent Application No. 61/793,952 filed Mar. 15, 2013; International Patent Application No. PCT/EP2011/056432 filed Apr. 21, 2011; U.S. Provisional Patent Application No. 61/882,546 filed Sep. 25, 2013; International Patent Application No. PCT/US2013/35149 filed Apr. 3, 2013; U.S.

patent application Ser. No. 13/839,118 filed Mar. 15, 2013; and U.S. Provisional Patent Application No. 61/621,385 filed Apr. 6, 2012, all of such applications are incorporated herein by reference in their entirety. Any of the techniques described herein, or described in other applications or patents referenced herein, may be applied to any of the various thermal devices, non-thermal devices, and uses described herein.

Turning now to the drawings, FIG. 1 illustrates an example electrical monitoring system 100. An electrical cabinet 105 houses various electrical equipment such as, for example, electrical switchgear, conductors, computers, servers, and/or other equipment as appropriate. Such electrical equipment may include an example conductor 110. An infrared camera 115 is positioned to monitor the thermal condition of the electrical equipment within cabinet 105. For example, camera 115 may be mounted to image the electrical equipment using a view port 120 on cabinet 105. In this fashion, the bulk of camera 115 may actually be external to cabinet 105 to enhance safety and code compliance issues in that it is conventional to require a certain amount of clearance about the conductors within an electrical cabinet. However, it will be appreciated that camera 115 may also be positioned substantially within or entirely within cabinet 105. For example, camera 115 may be fastened to an inner surface of cabinet 105 or other appropriate surface within cabinet 105 using magnets, fasteners, adhesives, and/or other appropriate techniques. Although a single camera 115 is illustrated in FIG. 1, additional cameras may be provided as desired to image some or all portions of the electrical equipment within cabinet 105.

The electromagnetic fields generated by current flowing through conductor 110 may be used to conveniently power camera 115 so as to avoid the need for a technician to periodically replace batteries or hardwire AC or DC current to provide power. The electromagnetic fields may be harvested using either an inductive coupling or a capacitive coupling. For example, an inductive coupling harvests a magnetic field 125 that is generated concentrically with regard to a current flow 130 within conductor 110. An inductive coupling thus includes a coil 135 that is arranged orthogonally to magnetic field 125 so that a current is induced in coil 135. Conductor 110 thus acts as a primary coil that transfers power to secondary coil 135 through an air core. In alternative embodiments, a magnetic core transformer may be used to inductively harvest power. Coil 135 may be configured with a resonant tank circuit to increase coupling from conductor 110. To produce a power source using this generated current, a power harvesting circuit 140 couples to coil 135 and charges a battery (or supercapacitor) 145. Battery 145 provides the power for camera 115 as well as a controller 150 and a wireless communication interface 155. Controller 150 controls camera 115 so that resulting thermal images may be wirelessly transmitted to a remote monitoring station (e.g., one or more display systems 420 of FIG. 4) using wireless interface 155 and an antenna(s) 160. A housing 165 protects monitoring system 100.

The transmission of thermal images may be supplemented with the transmission of visible light images and/or other non-thermal images as well. Thus, infrared camera 115 may be supplemented with a visible light camera or other non-thermal imaging sensor. In addition, parametric data about the thermal image such as the frame rate and exposure time may also be transmitted. Moreover, the wireless transmissions may include information identifying the monitored electrical cabinet such as an identification number and also its location. In addition, system 100 may monitor electrical parameters such as current, power, voltage, or phase angle information and wirelessly transmit the monitored electrical parameters to the remote monitoring station.

Controller 150 may analyze the thermal image from camera 115 with regard to setting a failure condition should the image indicate temperatures exceeding a pre-set tolerance. In that regard, monitoring system 100 may be configured with spot temperature sensors embedded in the electrical cabinet door or housing that are arranged to monitor particular targets within the electrical cabinet 105. System 100 may then package the temperature readings with the wireless transmission of the thermal images. In addition, the electrical cabinet 105 may be further configured with a plexiglass window to allow a technician to visually inspect the cabinet interior.

In alternative embodiments, monitoring system 100 may use a capacitive coupling instead of coil 135. In a capacitive coupling, coil 135 is replaced by conductive plates 136. One of the conductive plates 136 is grounded to a ground 137 for the electrical cabinet 105. The electrical activity within the cabinet 105 induces differential charges between the plates 136 that is harvested to power the monitoring system 100. Regardless of whether an inductive or a capacitive coupling is used, it will be appreciated that the amount of harvestable power through such couplings is typically small. For example, the energy produced by power harvesting circuit 140 is generally in the microwatt to milliwatt range. In contrast, significantly more power is typically required for infrared camera operation and wireless transmission such as through WiFi or Bluetooth. To conserve power, controller 150 may command camera 115 to only capture image frames periodically. For example, frame rates may be in the several per minute range or less.

Figure 2:
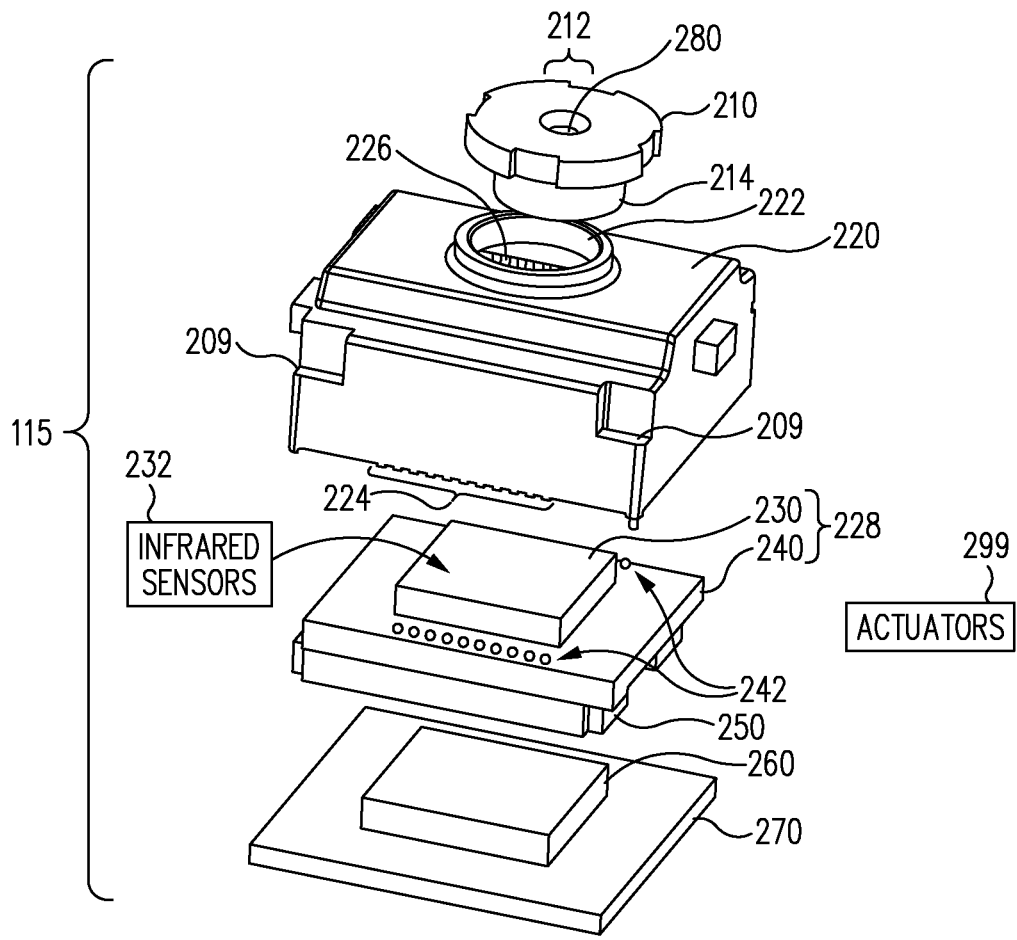
FIG. 2 illustrates an infrared imaging module configured to be implemented in an electrical cabinet monitoring system in accordance with an embodiment of the disclosure.

To operate successfully using such relatively low powers, camera 115 may be constructed as shown in FIG. 2. In this small-form-factor embodiment, camera 115 saves power and cost by not including a shutter. The embodiment of FIG. 2 is better understood with regard to the following noise discussion. Infrared imaging devices (e.g., thermal imagers) often suffer from various types of noise, such as high spatial frequency fixed pattern noise (FPN). Some FPN may be correlated to rows and/or columns of infrared sensors. For example, FPN noise that appears as column noise may be caused by variations in column amplifiers and include a 1/f component. Such column noise can inhibit the ability to distinguish between desired vertical features of a scene and vertical FPN. Other FPN may be spatially uncorrelated, such as noise caused by pixel to pixel signal drift which may also include a 1/f component.

A conventional approach to removing FPN relies on an internal or external shutter that is selectively placed in front of infrared sensors of an infrared imaging device to provide a substantially uniform scene. The infrared sensors may be calibrated based on images captured of the substantially uniform scene while the shutter is positioned in front of the infrared sensors. Such a process is denoted as a non-uniformity correction (NUC) procedure. However, in applications as discussed herein, it is desired to achieve a small-form factor and low-power operation for infrared imaging. The inclusion of a shutter can increase the size, cost, and power demands of such devices. Thus, an infrared camera is disclosed herein that obviates the need for a shutter through an innovative NUC procedure.

FIG. 2 illustrates an exploded view of a low-power, small-form factor infrared camera embodiment 115 configured to implement NUC without a shutter. Infrared camera 115 may include a lens barrel 210, a housing 220 (e.g., including surfaces 209 configured to receive engagement members of a socket for socket-based installations), an infrared sensor assembly 228, a circuit board 270, a base 250, and a processing module 260.

Lens barrel 210 may at least partially enclose an optical element 280 (e.g., a lens) which is partially visible in FIG. 2 through an aperture 212 in lens barrel 210. Lens barrel 210 may include a substantially cylindrical extension 214 which may be used to interface lens barrel 210 with an aperture 222 in housing 220.

Infrared sensor assembly 228 may be implemented, for example, with a cap 230 (e.g., a lid) mounted on a substrate 240. Infrared sensor assembly 228 may include a plurality of infrared sensors 232 (e.g., infrared detectors) implemented in an array or other fashion on substrate 240 and covered by cap 230. For example, in one embodiment, infrared sensor assembly 228 may be implemented as a focal plane array (FPA). Such a focal plane array may be implemented, for example, as a vacuum package assembly (e.g., sealed by cap 230 and substrate 240). In one embodiment, infrared sensor assembly 228 may be implemented as a wafer level package (e.g., infrared sensor assembly 228 may be singulated from a set of vacuum package assemblies provided on a wafer). In one embodiment, infrared sensor assembly 228 may be configured to operate using a power supply of approximately 2.4 volts, 2.5 volts, 2.8 volts, or similar voltages.

Infrared sensors 232 may be configured to detect infrared radiation (e.g., infrared energy) from a target scene within an electrical cabinet including, for example, mid wave infrared wave bands (MWIR), long wave infrared wave bands (LWIR), and/or other thermal imaging bands as may be desired in particular implementations. In one embodiment, infrared sensor assembly 228 may be provided in accordance with wafer level packaging techniques.

Infrared sensors 232 may be implemented, for example, as microbolometers or other types of thermal imaging infrared sensors arranged in any desired array pattern to provide a plurality of pixels. In one embodiment, infrared sensors 232 may be implemented as vanadium oxide (VOx) detectors with a 17 μm pixel pitch. In various embodiments, arrays of approximately 32 by 32 infrared sensors, approximately 64 by 64 infrared sensors, approximately 80 by 64 infrared sensors, or other array sizes may be used to arrange infrared sensors 232.

Substrate 240 may include various circuitry including, for example, a read out integrated circuit (ROIC) with dimensions less than approximately 5.5 mm by 5.5 mm in one embodiment. Substrate 240 may also include bond pads 242 that may be used to contact complementary protruding connections 224 that extend from electrical connections 226 positioned on inside surfaces of camera housing 220 and/or contact appropriate connections of housing 165 (FIG. 1).

In one embodiment, the ROIC may be implemented with low-dropout regulators (LDO) to perform voltage regulation to reduce power supply noise introduced to infrared sensor assembly 228 and thus provide an improved power supply rejection ratio (PSRR). Moreover, by implementing the LDO with the ROIC (e.g., within a wafer level package), less die area may be consumed and fewer discrete die (or chips) are needed.

Infrared sensor assembly 228 may capture images (e.g., image frames) and provide such images from its ROIC at various rates. Processing module 260 may be used to perform appropriate processing of captured infrared images and may be implemented in accordance with any appropriate architecture. In one embodiment, processing module 260 may be implemented as an ASIC. In this regard, such an ASIC may be configured to perform image processing with high performance and/or high efficiency. In another embodiment, processing module 260 may be implemented with a general purpose central processing unit (CPU) which may be configured to execute appropriate software instructions to perform image processing and coordinate with controller 150 (FIG. 1).

Figure 3:
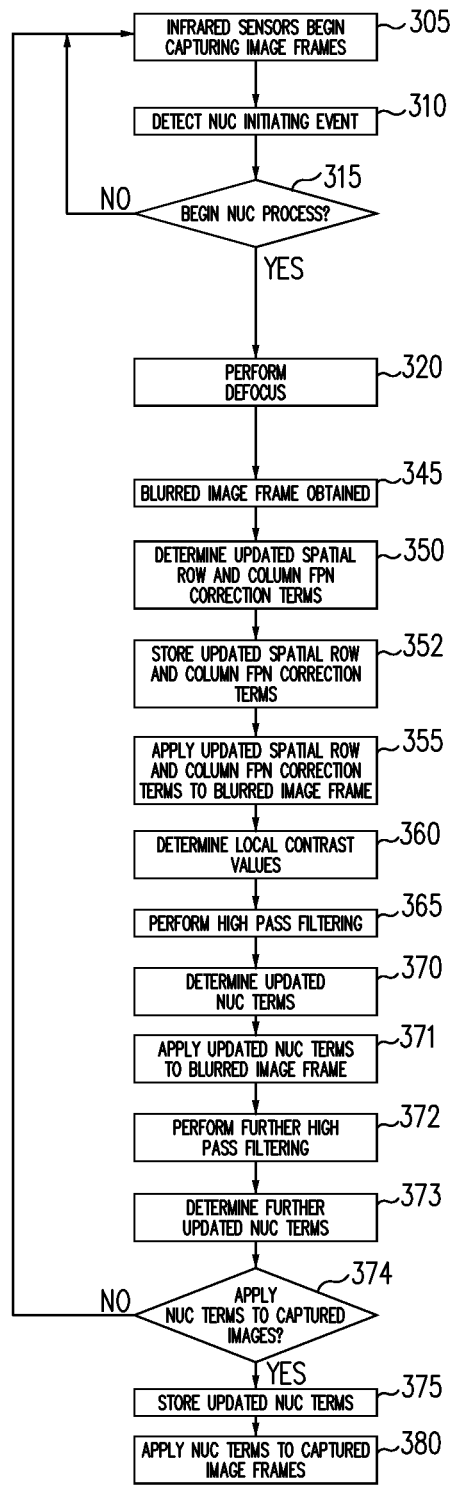
FIG. 3 illustrates a flow diagram of various operations to determine NUC terms in accordance with an embodiment of the disclosure.

The NUC procedure practiced by camera 115 may be better understood with reference to the flowchart of FIG. 3. In block 305, infrared sensors 232 begin capturing image frames of an electrical cabinet scene. In block 310, a NUC process initiating event is detected. For example, a NUC process may be initiated by controller 150 (FIG. 1) if a minimum time has elapsed since a previously performed NUC process. In a further example, a NUC process may be initiated by controller 150 if infrared camera 110 has experienced a minimum temperature change since a previously performed NUC process.

In block 315, after a NUC process initiating event is detected, it is determined whether the NUC process should actually be performed. In this regard, the NUC process may be selectively initiated based on whether one or more additional conditions are met. For example, in one embodiment, the NUC process may not be performed unless infrared camera 115 has experienced a minimum temperature change since a previously performed NUC process. Other criteria or conditions may be used in other embodiments. If appropriate criteria or conditions have been met, then the flow diagram continues to block 320. Otherwise, the flow diagram returns to block 305.

In block 320, a defocus operation may be performed to intentionally defocus the image frames captured by infrared sensors 232. For example, in one embodiment, one or more actuators 299 (FIG. 2) may be used to adjust, move, or otherwise translate optical element 280, infrared sensor assembly 228, and/or other components of infrared camera 110 to cause infrared sensors 232 to capture a blurred (e.g., unfocused) image frame of the electrical cabinet scene. Other non-actuator based techniques are also contemplated for intentionally defocusing infrared image frames such as, for example, manual (e.g., user-initiated) defocusing. In block 345, a blurred image frame of the electrical cabinet scene will be provided with FPN being more clearly defined in the blurred image than would be the case for an focused image.

In the above discussion, the defocus-based approach has been described with regard to a single captured image frame. In another embodiment, the defocus-based approach may include accumulating multiple image frames while infrared camera 115 has been defocused and averaging the defocused image frames to remove the effects of temporal noise and provide a blurred image frame in block 345. The defocusing process may be considered to act as a lowpass filter on the electrical cabinet image. Other techniques are also contemplated to obtain blurred images such as, for example, any of the techniques set forth in International Patent Application No. PCT/US2012/041749 filed Jun. 8, 2012 and U.S. Provisional Patent Application No. 61/545,056 filed Oct. 7, 2011, both of which are hereby incorporated by reference in their entirety. In block 350, the blurred image frame is processed to determine updated row and column FPN terms (e.g., if row and column FPN terms have not been previously determined then the updated row and column FPN terms may be new row and column FPN terms in the first iteration of block 350). As used in this disclosure, the terms row and column may be used interchangeably depending on the orientation of infrared sensors 232 and/or other components of infrared camera 115.

In one embodiment, block 350 includes determining a spatial FPN correction term for each row of the blurred image frame (e.g., each row may have its own spatial FPN correction term), and also determining a spatial FPN correction term for each column of the blurred image frame (e.g., each column may have its own spatial FPN correction term). Such processing may be used to reduce the spatial and slowly varying (1/f) row and column FPN inherent in thermal imagers caused by, for example, 1/f noise characteristics which may manifest as vertical and horizontal stripes in image frames.

Advantageously, by determining spatial row and column FPN terms using the blurred image frame, there will be a reduced risk of vertical and horizontal objects in the actual imaged scene from being mistaken for row and column noise (e.g., real scene content will be blurred while FPN remains unblurred).

In one embodiment, row and column FPN terms may be determined by considering differences between neighboring pixels of the blurred image frame. For example, a pixel in the blurred image frame may be compared to its 8 nearest horizontal neighbors. Differences between the neighbor pixels can be averaged to obtain an estimate of the offset error of the resulting group of pixels. An offset error may be calculated for each pixel in a row or column and the average result may be used to correct the entire row or column.

To prevent real scene data from being interpreted as noise, upper and lower threshold values may be used. Pixel values falling outside these threshold values are not used to obtain the offset error. In addition, the maximum amount of row and column FPN correction may be limited by these threshold values.

Further techniques for performing spatial row and column FPN correction processing are set forth in U.S. patent application Ser. No. 12/396,340 filed Mar. 2, 2009 which is incorporated herein by reference in its entirety.

Referring again to FIG. 3, the updated row and column FPN terms determined in block 350 are stored in block 352 and applied in block 355 to the blurred image frame obtained in block 345. After these terms are applied, some of the spatial row and column FPN in the blurred image frame may be reduced. However, because such terms are applied generally to rows and columns, additional FPN may remain such as spatially uncorrelated FPN associated with pixel to pixel drift or other causes. Neighborhoods of spatially correlated FPN may also remain which may not be directly associated with individual rows and columns. Accordingly, further processing may be performed as discussed below to determine NUC terms.

In block 360, local contrast values (e.g., edges or absolute values of gradients between adjacent or small groups of pixels) in the blurred image frame are determined. If scene information in the blurred image frame includes contrasting areas that have not been significantly blurred (e.g., high contrast edges in the original scene data), then such features may be identified by a contrast determination process in block 360.

For example, local contrast values in the blurred image frame may be calculated, or any other desired type of edge detection process may be applied to identify certain pixels in the blurred image as being part of an area of local contrast. Pixels that are marked in this manner may be considered as containing excessive high spatial frequency scene information that would be interpreted as FPN (e.g., such regions may correspond to portions of the scene that have not been sufficiently blurred). As such, these pixels may be excluded from being used in the further determination of NUC terms. In one embodiment, such contrast detection processing may rely on a threshold that is higher than the expected contrast value associated with FPN (e.g., pixels exhibiting a contrast value higher than the threshold may be considered to be scene information, and those lower than the threshold may be considered to be exhibiting FPN).

In one embodiment, the contrast determination of block 360 may be performed on the blurred image frame after row and column FPN terms have been applied to the blurred image frame. In another embodiment, block 360 may be performed prior to block 350 to determine contrast before row and column FPN terms are determined (e.g., to prevent scene based contrast from contributing to the determination of such terms).

Following block 360, it is expected that any high spatial frequency content remaining in the blurred image frame may be generally attributed to spatially uncorrelated FPN. In this regard, following block 360, much of the other noise or actual desired scene based information has been removed or excluded from the blurred image frame due to: intentional blurring of the image frame (the defocusing in block 320), application of row and column FPN terms (block 355), and contrast determination (block 360).

Thus, it can be expected that following block 360, any remaining high spatial frequency content (e.g., exhibited as areas of contrast or differences in the blurred image frame) may be attributed to spatially uncorrelated FPN. Accordingly, in block 365, the blurred image frame is high pass filtered. In one embodiment, this may include applying a high pass filter to extract the high spatial frequency content from the blurred image frame. In another embodiment, this may include applying a low pass filter to the blurred image frame and taking a difference between the low pass filtered image frame and the unfiltered blurred image frame to obtain the high spatial frequency content. In accordance with various embodiments of the present disclosure, a high pass filter may be implemented by calculating a mean difference between a sensor signal (e.g., a pixel value) and its neighbors.

In block 370, a flat field correction process is performed on the high pass filtered blurred image frame to determine updated NUC terms (e.g., if a NUC process has not previously been performed then the updated NUC terms may be new NUC terms in the first iteration of block 370). To perform flat field correction, a NUC term may be determined for each pixel of the blurred image frame using the values of its neighboring pixels. For each pixel, several gradients may be determined based on the absolute difference between the values of various adjacent pixels. For example, absolute value differences may be determined between pixels to establish a left to right diagonal gradient, a top to bottom vertical gradient, a right to left diagonal gradient, and a left to right horizontal gradient.

These absolute differences may be summed to provide a summed gradient for the pixel being examined. A weight value may be determined for the examined pixel that is inversely proportional to the summed gradient. This process may be performed for all pixels of the blurred image frame until a weight value is provided for each pixel. For areas with low gradients (e.g., areas that are blurry or have low contrast), the weight value will be close to one. Conversely, for areas with high gradients, the weight value will be zero or close to zero. The update to the NUC term as estimated by the high pass filter is multiplied with the weight value.

In one embodiment, the risk of introducing scene information into the NUC terms can be further reduced by applying some amount of temporal damping to the NUC term determination process. For example, a temporal damping factor λ between 0 and 1 may be chosen such that the new NUC term (NUCNEW) stored is a weighted average of the old NUC term (NUCOLD) and the estimated updated NUC term (NUCUPDATE). In one embodiment, this can be expressed as NUCNEW=λ·NUCOLD+(1−λ)·(NUCOLD+NUCUPDATE).

Although the determination of NUC terms has been described with regard to gradients, local contrast values may be used instead where appropriate. Other techniques may also be used such as, for example, standard deviation calculations. Other types flat field correction processes may be performed to determine NUC terms including, for example, various processes identified in U.S. Pat. No. 6,028,309 issued Feb. 22, 2000, U.S. Pat. No. 6,812,465 issued Nov. 2, 2004, and U.S. patent application Ser. No. 12/114,865 filed May 5, 2008, which are incorporated herein by reference in their entirety.

Referring again to FIG. 3, block 370 may include additional processing of the NUC terms. For example, in one embodiment, to preserve the scene signal mean, the sum of all NUC terms may be normalized to zero by subtracting the NUC term mean from each NUC term. Also in block 370, to avoid row and column noise from affecting the NUC terms, the mean value of each row and column may be subtracted from the NUC terms for each row and column. As a result, row and column FPN filters using the row and column FPN terms determined in block 350 may be better able to filter out row and column noise in further iterations after the NUC terms are applied to captured images (e.g., in block 380 further discussed herein). In this regard, the row and column FPN filters may in general use more data to calculate the per row and per column offset coefficients (e.g., row and column FPN terms) and may thus provide a more robust alternative for reducing spatially correlated FPN than the NUC terms which are based on high pass filtering to capture spatially uncorrelated noise.

In blocks 371-373, additional high pass filtering and further determinations of updated NUC terms may be optionally performed to remove spatially correlated FPN with lower spatial frequency than previously removed by row and column FPN terms. In this regard, some variability in infrared sensors 232 or other components of infrared camera 110 may result in spatially correlated FPN noise that cannot be easily modeled as row or column noise. Such spatially correlated FPN may include, for example, window defects on a sensor package or a cluster of infrared sensors 232 that respond differently to irradiance than neighboring infrared sensors 232. In one embodiment, such spatially correlated FPN may be mitigated with an offset correction. If the amount of such spatially correlated FPN is significant, then the noise may also be detectable in the blurred image frame. Since this type of noise may affect a neighborhood of pixels, a high pass filter with a small kernel may not detect the FPN in the neighborhood (e.g., all values used in high pass filter may be taken from the neighborhood of affected pixels and thus may be affected by the same offset error). For example, if the high pass filtering of block 365 is performed with a small kernel (e.g., considering only immediately adjacent pixels that fall within a neighborhood of pixels affected by spatially correlated FPN), then broadly distributed spatially correlated FPN may not be detected.

Referring again to FIG. 3, in blocks 371-373, additional high pass filtering and further determinations of updated NUC terms may be optionally performed to remove spatially correlated FPN. In block 371, the updated NUC terms determined in block 370 are applied to the blurred image frame. Thus, at this time, the blurred image frame will have been initially corrected for spatially correlated FPN (e.g., by application of the updated row and column FPN terms in block 355), and also initially corrected for spatially uncorrelated FPN (e.g., by application of the updated NUC terms applied in block 371).

In block 372, a further high pass filter is applied with a larger kernel than was used in block 365, and further updated NUC terms may be determined in block 373. For example, to detect the spatially correlated FPN present in the defocused image frame pixels, the high pass filter applied in block 372 may include data from a sufficiently large enough neighborhood of pixels such that differences can be determined between unaffected pixels and affected pixels. For example, a low pass filter with a large kernel can be used (e.g., an N by N kernel that is much greater than 3 by 3 pixels) and the results may be subtracted to perform appropriate high pass filtering.

In one embodiment, for computational efficiency, a sparse kernel may be used such that only a small number of neighboring pixels inside an N by N neighborhood are used. For any given high pass filter operation using distant neighbors (e.g., a large kernel), there is a risk of modeling actual (potentially blurred) scene information as spatially correlated FPN. Accordingly, in one embodiment, the temporal damping factor λ may be set close to 1 for updated NUC is determined in block 373.

In various embodiments, blocks 371-373 may be repeated (e.g., cascaded) to iteratively perform high pass filtering with increasing kernel sizes to provide further updated NUC terms further correct for spatially correlated FPN of desired neighborhood sizes. In one embodiment, the decision to perform such iterations may be determined by whether spatially correlated FPN has actually been removed by the updated NUC terms of the previous performance of blocks 371-373.

After blocks 371-373 are finished, a decision is made regarding whether to apply the updated NUC terms to captured image frames (block 374). For example, if an average of the absolute value of the NUC terms for the entire image frame is less than a minimum threshold value, or greater than a maximum threshold value, the NUC terms may be deemed spurious or unlikely to provide meaningful correction. Alternatively, thresholding criteria may be applied to individual pixels to determine which pixels receive updated NUC terms. In one embodiment, the threshold values may correspond to differences between the newly calculated NUC terms and previously calculated NUC terms. In another embodiment, the threshold values may be independent of previously calculated NUC terms. Other tests may be applied (e.g., spatial correlation tests) to determine whether the NUC terms should be applied.

If the NUC terms are deemed spurious or unlikely to provide meaningful correction, then the flow diagram returns to block 305. Otherwise, the newly determined NUC terms are stored (block 375) to replace previous NUC terms (e.g., determined by a previously performed iteration of FIG. 3) and applied (block 380) to captured image frames. Additional details regarding this advantageous NUC algorithm are discussed in U.S. Provisional Application No. 61/545,056, filed Oct. 7, 2011, the contents of which are incorporated by reference in their entirety.

Figure 4:
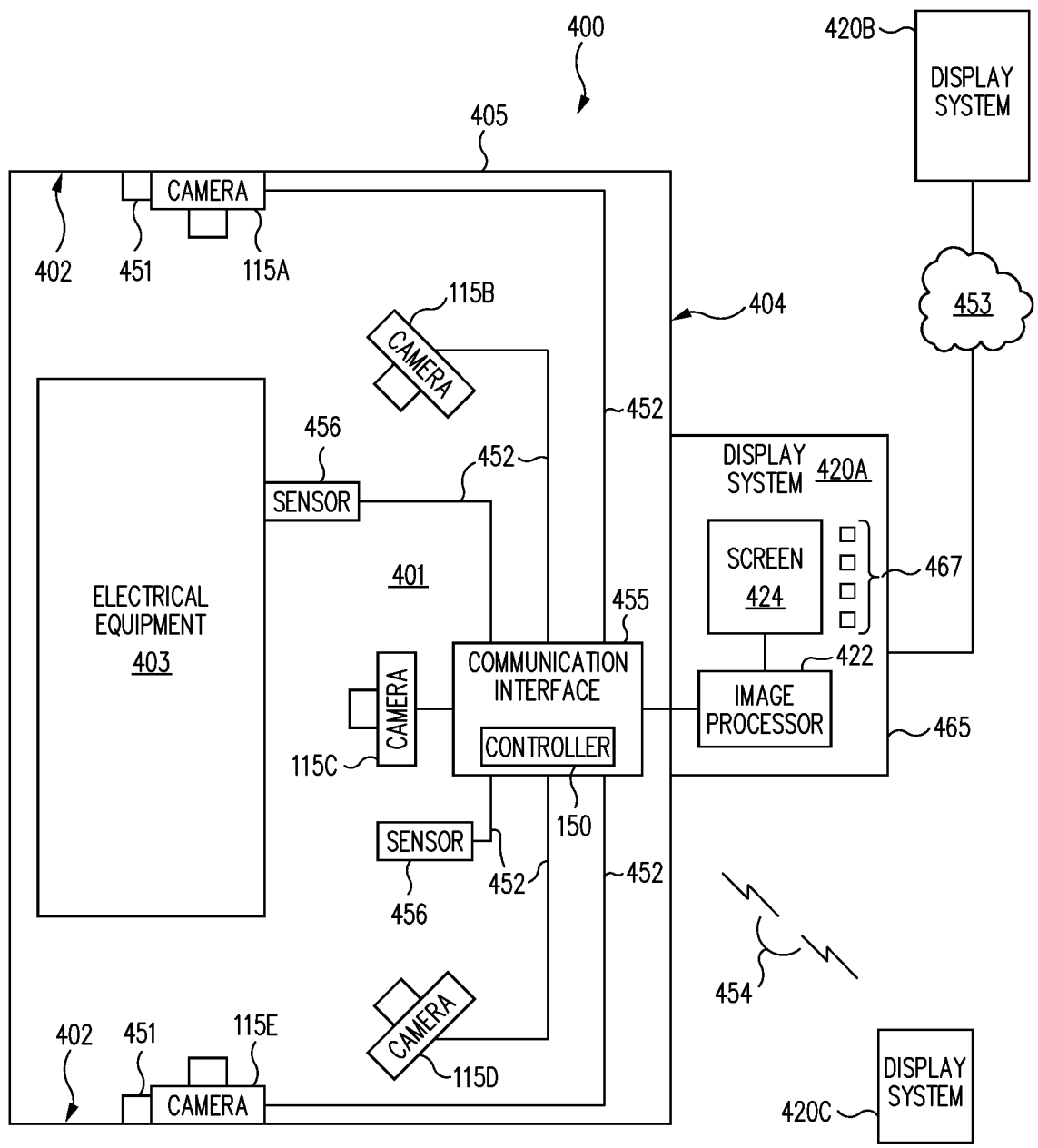
FIG. 4 illustrates another example monitoring system in accordance with an embodiment of the disclosure.

FIG. 4 illustrates another example monitoring system 400 in accordance with an embodiment of the disclosure. Monitoring system 400 may be used, for example, to capture, communicate, process, and/or display thermal images of electrical equipment 403 positioned in an interior cavity 401 of an electrical cabinet 405. Monitoring system 400 may include, for example, one or more infrared cameras 115 (e.g., denoted 115A-E in FIG. 4), one or more communication interfaces 455, and one or more display systems 420 (e.g., denoted 420A-C in FIG. 4).

Infrared cameras 115 may be positioned at various locations within interior cavity 401 of electrical cabinet 405 to provide views of electrical equipment 403. Although particular infrared cameras 115 are illustrated in a substantially hemispherical arrangement around electrical equipment 403, any desired camera arrangement may be used. For example, in some embodiments, various infrared cameras 115 may be arranged to completely surround electrical equipment 403, to view selected portions of electrical equipment 403, or other arrangements.

Infrared cameras 115A and 115E are illustrated as being mounted to interior surfaces 402 of electrical cabinet 405. For purposes of clarity, infrared cameras 115B-D are illustrated without corresponding support structures. However, any desired support structures may be used for any of infrared cameras 115.

Although electrical equipment 403 is illustrated as being positioned proximate to one wall (e.g., a rear wall) of electrical cabinet 405, electrical equipment 403 may be disposed at any location or multiple locations within electrical cabinet 405. Infrared cameras 115 may be positioned as desired to view appropriate portions of electrical equipment 403, depending on the particular position of electrical equipment 403 within electrical cabinet 405.

In some embodiments, electrical cabinet 405 may include electrical connectors 451 which may be used to provide power to infrared cameras 115. In this regard, infrared cameras 115A and 115E are illustrated as receiving electrical power through a physical coupling to electrical connectors 451. For purposes of clarity, infrared cameras 115B-D are illustrated without their corresponding electrical connectors.

Any desired combination of electrical connectors 451 of FIG. 4 and/or electromagnetic field harvesting/storing/powering components of FIG. 1 may be used to power infrared cameras 115. For example, any of infrared cameras 115A-E may be powered by physical electrical connectors 451, harvested electromagnetic energy, and/or both.

Infrared cameras 115 may provide captured thermal images and/or other data to communication interface 455 over various communication busses 452. In FIG. 4, communication interface 455 is illustrated as a wired communication interface. However, communication interface 455 may be implemented as a wireless communication interface (e.g., in the manner of wireless communication interface 155) or a hybrid wired/wireless interface supporting any desired combination of wired and/or wireless communication with infrared cameras 115 and/or other components. In some embodiments, communication interface 455 may be implemented to include controller 150 previously described herein. In some embodiments, controller 150 may be implemented separately from communication interface 455.

Communication interface 455 and/or other components may be implemented to communicate in accordance with any appropriate protocols such as, for example, Modbus, Modbus TCP, Ethernet, WiFi, Bluetooth, and/or others.

Communication interface 455 may also receive data from one or more sensors 456 (e.g., temperature sensors, current sensors, power sensors, voltage sensors, phase angle sensors, and/or others) which may be provided as part of monitoring system 400 at any desired location within and/or outside of electrical cabinet 405. For example, as shown in FIG. 4, various sensors 456 may be positioned on electrical equipment 403 or away from electrical equipment 403. Sensor data may be received by communication interface 455 over various communication busses 452 and passed by communication interface 455 to other components as desired.

One or more display systems 420 (e.g., denoted 420A-C) may be provided to permit monitoring of thermal images and data provided by communication interface 455. For example, display system 420A includes a housing 465, an image processor 422, a user-viewable screen 424, and user controls 467.

Image processor 422 may process thermal images received from communication interface 455 to prepare user-viewable images to be displayed on screen 424. For example, in some embodiments, image processor 422 may be configured to provide thermal images to screen 424 for simultaneous viewing by the user.

In some embodiments, image processor 422 may be configured to combine thermal images into composite thermal images by performing various image processing. For example, multiple thermal images may be assembled (e.g., "stitched together") to provide composite thermal images showing a panorama view or other view of electrical equipment 403. Image processor 422 may provide such composite thermal images to screen 424 for viewing by the user. Such composite thermal images may be provided in addition to and/or instead of the original thermal images to permit the user to conveniently switch between different views if desired (e.g., by controlling the operation of image processor 422 by user controls 467).

In some embodiments, image processor 422 may embed additional information (e.g., sensor provided by sensors 456) in thermal images and/or composite thermal images provided to screen 424. In some embodiments, image processor 422 may perform any of the various image processing described or incorporated by reference herein including, for example, NUC. Other image processing may also be performed such as, for example, measurement, colorization, noise reduction, or other processes. In some embodiments, image processor 422 may perform various processing operations in combination with or separate from controller 150, communication interface 455, processing module 260, and/or other components.

Although various components of monitoring system 400 are illustrated as being positioned inside electrical cabinet 405 (e.g., in interior cavity 401) and others are positioned outside, any of the various components may be positioned inside or outside as may be desired for particular implementations. For example, in some embodiments, image processor 422 and/or other components may be positioned outside electrical cabinet 405 and within housing 465 to prevent any heat given off by such components from affecting the temperature or thermal images captured from within electrical cabinet 405. In other embodiments, some or all of such components may be positioned within electrical cabinet 405, or within a wall thereof. In other embodiments, controller 150, communication interface 455, and/or other components may be mounted outside of electrical cabinet 405 (e.g., within housing 465 or elsewhere).

As shown in FIG. 4, display system 420A may be mounted, for example, on an outside surface 404 (e.g., a door or panel) of electrical cabinet 405. In this regard, screen 424 may be positioned such that a user may conveniently view thermal images or composite thermal images while in proximity to electrical cabinet 405.

Other display systems are also contemplated. For example, a display system 420B may be positioned remotely from electrical cabinet 405. In this regard, display system 420B may communicate with other portions of monitoring system 400 over a network 453 (e.g., one or more wired and/or wireless networks).

As another example, a display system 420C may be implemented as a mobile device. In this regard, display system 420C may be implemented with dedicated hardware, software running on generic or dedicated hardware (e.g., an application running on a smart phone or tablet), and/or other implementations. As shown in FIG. 4, display system 420C may communicate with other portions of monitoring system 400 through wireless signals 454 (e.g., received by communication interface 455 when implemented to provide support for wireless communication). In some embodiments, infrared cameras 115 may be implemented with built-in support for wireless communication to permit wireless communication with any of display systems 420A-C.

Any of display systems 420A-C may be implemented with image processors 422, screens 424, user controls 467, housings 465, communication components, processors, memories, and/or other appropriate components. It is contemplated that components may be shared by various display systems. For example, in some embodiments, a single image processor 422 may be provided for monitoring system 400. In this regard, thermal images and/or composite thermal images may be provided from image processor 422 to any of display systems 420A-C through appropriate wired or wireless communication techniques.

Figure 5:
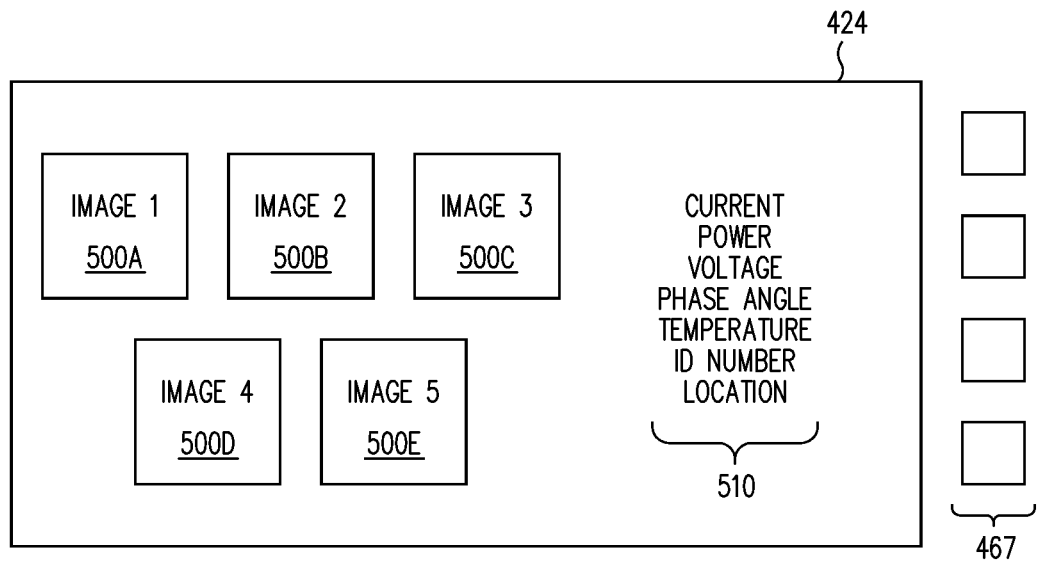
FIGS. 5-6 illustrate example user interfaces of display systems in accordance with embodiments of the disclosure.
Figure 6:
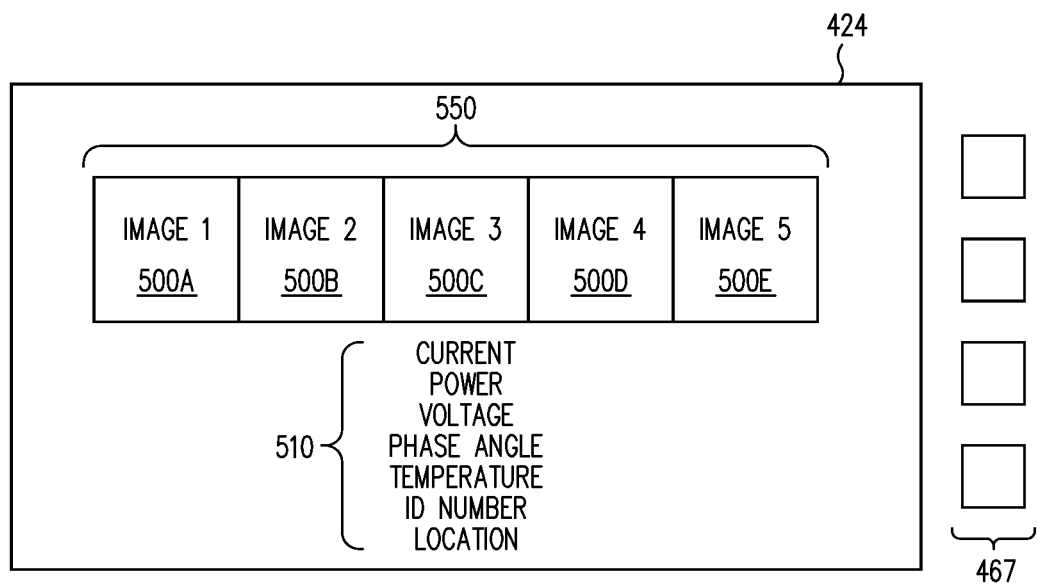

FIGS. 5-6 illustrate example user interfaces of display systems 420 in accordance with embodiments of the disclosure. Referring to FIG. 5, screen 424 simultaneously displays images 500A, 500B, 500C, 500D, and 500E captured by corresponding infrared cameras 115A-E. Screen 424 also displays information 510 such as various parameters associated with electrical equipment 403 and/or electrical cabinet 405. In some embodiments, such information may be passed by infrared cameras 115, sensors 456, controller 150, and/or other components through communication interface 455 to image processor 422 and/or display 424. For example, in some embodiments, information 510 may be based on readings provided by sensors 456 and/or processing performed on thermal images captured by infrared cameras 115.

As also shown in FIG. 5A, various user controls 467 may be provided to permit a user to select various thermal images and/or information to be displayed on screen 424. For example, in some embodiments, user operation of controls 467 may send appropriate control signals to screen 424, image processor 422, communication interface 455, controller 150, cameras 115, sensors 456, and/or other components. Although controls 430 are illustrated as buttons, any desired type of user control may be provided. For example, in some embodiments, screen 424 may be a user control implemented as a touchscreen.

Referring to FIG. 6, screen 424 simultaneously displays a composite thermal image 550 prepared by appropriate processing of images 500A-E. In this regard, composite thermal image 550 may provide a panoramic view of electrical equipment 403 collectively provided by infrared cameras 115A-E.

In some embodiments, monitoring system 400 may be configured to provide alerts and/or take corrective action (e.g., disabling and/or otherwise adjusting the operation of electrical equipment 403) in response to user controls 467 (e.g., a user-initiated operation performed in response to a user's review of images or information provided on screen 424). In some embodiments, monitoring system 400 may be configured to provide alerts and/or take corrective action automatically in response to the processing of images and/or sensor data.

In some situations, it may be desirable to obtain additional images such as non-thermal images of one or more portions of electrical equipment in a cabinet such as electrical equipment in electrical cabinet 105 of FIG. 1, electrical equipment 403 of FIG. 4, or other electrical equipment. For example, a user of a monitoring system may wish to obtain relatively higher resolution images of a particular portion of a scene (e.g., a region of interest such as a portion of electrical equipment that is exhibiting undesirably high temperatures based on thermal images of that portion) than can be obtained using infrared imaging alone. In order to provide enhanced monitoring of an electrical system, a monitoring system may therefore be provided with one or more non-thermal cameras in addition to one or more infrared cameras 115.

Figure 7:
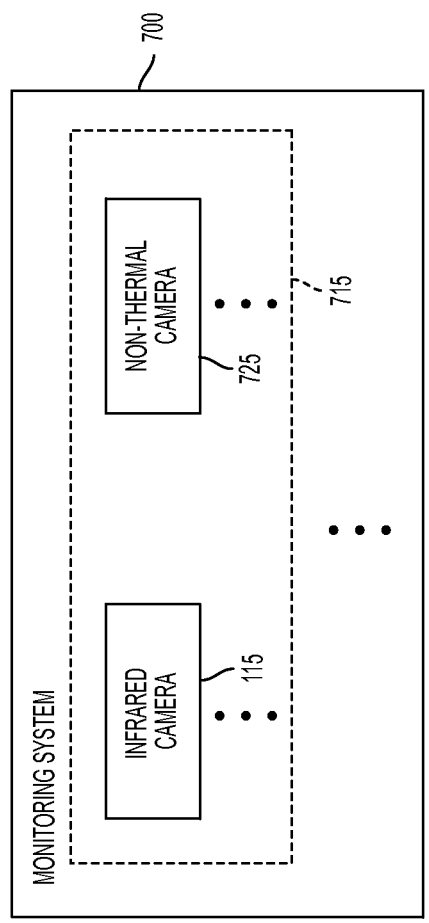
FIG. 7 illustrates an example monitoring system having cameras with thermal and non-thermal imaging capabilities in accordance with an embodiment of the disclosure.

FIG. 7 illustrates a monitoring system 700 that includes one or more non-thermal cameras 725 in addition to one or more infrared cameras 115. As examples, monitoring system 700 may be an embodiment of monitoring system 100 of FIG. 1, monitoring system 400 of FIG. 4, or other suitable monitoring systems. As shown in FIG. 7, one or more non-thermal cameras 725 and one or more infrared cameras 115 may be provided in a common package such as multi-spectrum camera 715. However, this is merely illustrative. If desired, system 700 may be provided with one or more non-thermal cameras 725 and one or more separate infrared cameras 115.

In some embodiments, a monitoring system may include non-thermal cameras and infrared cameras having substantially overlapping fields-of-view. In other embodiments, a monitoring system may include non-thermal cameras and infrared cameras having substantially different fields-of-view.

As described in further detail herein, the thermal images and non-thermal images from infrared camera 115 and non-thermal camera 725 respectively may be fused, superimposed, or otherwise combined to form processed images such as multi-spectrum images. Multi-spectrum images may provide a user of a monitoring system with high resolution, high contrast, and/or targeted contrast combined images of monitored equipment. In this fashion, a user of a monitoring system may be provided with an advantageously enhanced ability to localize or otherwise analyze potentially problematic portions of monitored equipment.

Figure 8:
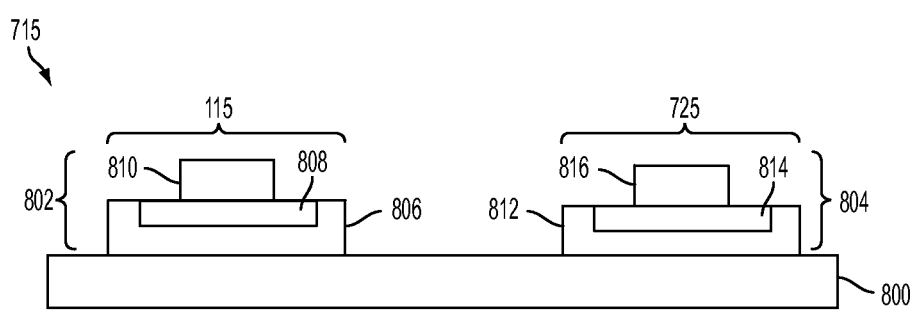
FIG. 8 illustrates an example multi-spectrum camera with thermal and non-thermal imaging capabilities in accordance with an embodiment of the disclosure.
Figure 9:
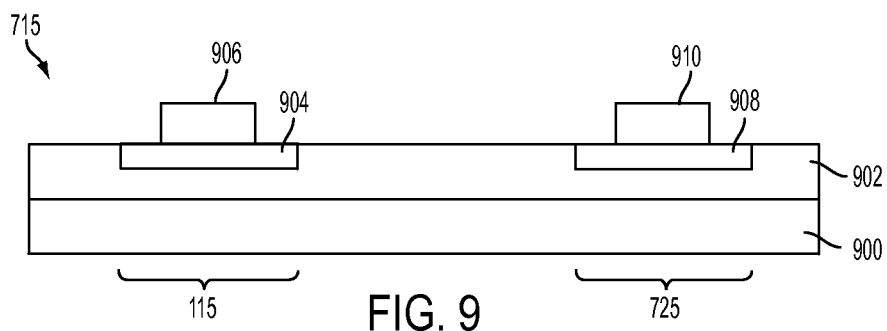
FIG. 9 illustrates another example multi-spectrum camera with thermal and non-thermal imaging capabilities in accordance with an embodiment of the disclosure.

FIGS. 8 and 9 illustrate example configurations for a multi-spectrum camera 715. As shown in FIG. 8, multi-spectrum camera 715 may be formed from an infrared sensor assembly 802 and a non-thermal sensor assembly 804 that are attached to a common circuit board 800 (e.g., a rigid or flexible printed circuit).

Infrared sensor assembly may include an infrared sensor array 808 formed on an infrared sensor substrate 806 and optical components 810 that guide infrared light onto the infrared sensor array. Sensor array 808, substrate 806, and optical elements 810 may be implemented, for example, as described above in connection similar components shown in FIG. 2.

Non-thermal sensor assembly 804 may include an array of non-thermal image sensor elements 814 formed on a non-thermal sensor substrate 812. Non-thermal sensor assembly 804 may also include optical elements 816 (e.g., one or more lenses, one or more filters, one or more mirrors, or other suitable light-guiding elements) that guide non-thermal radiation (e.g., visible light, near-infrared light, short wave infrared light, or other non-thermal light) onto non-thermal image sensor elements 814.

Non-thermal image sensor elements 814 may include charge-coupled device (CCD) sensors, electron multiplying CCD (EMCCD) sensors, complementary metal-oxide-semiconductor (CMOS) sensors, scientific CMOS (sCMOS) sensors, intensified charge-coupled device (ICCD) sensors, near-infrared sensors, or other non-thermal radiation sensors.

As shown in FIG. 9, in another embodiment, imaging components of multi-spectrum camera 715 may be formed on a common substrate. In the example of FIG. 9, non-thermal camera 725 may be formed from an array of non-thermal image sensor elements 908 that are formed on a common substrate 902 with infrared sensor elements such as infrared sensor elements 904. Substrate 902 may also be attached to a printed circuit such as printed circuit 900 (e.g., a flexible or rigid printed circuit).

Non-thermal camera 725 may also include optical elements 910 (e.g., one or more lenses, one or more filters, one or more mirrors, or other suitable light-guiding elements) that guide non-thermal radiation (e.g., visible light, near-infrared light, short wave infrared light, or other non-thermal light) onto non-thermal image sensor elements 908 (e.g., charge-coupled device (CCD) sensors, electron multiplying CCD (EMCCD) sensors, complementary metal-oxide-semiconductor (CMOS) sensors, scientific CMOS (sCMOS) sensors, intensified charge-coupled device (ICCD) sensors, near-infrared sensors, or other non-thermal radiation sensors). Optical elements 906 may guide infrared light onto infrared sensor elements 904. However, the examples of FIGS. 8 and 9 in which infrared camera 115 and non-thermal camera 725 are implemented in a common package that forms multi-spectrum camera 715 are merely illustrative. If desired a monitoring system may include separate infrared cameras 115 and non-thermal cameras 725.

Figure 10:
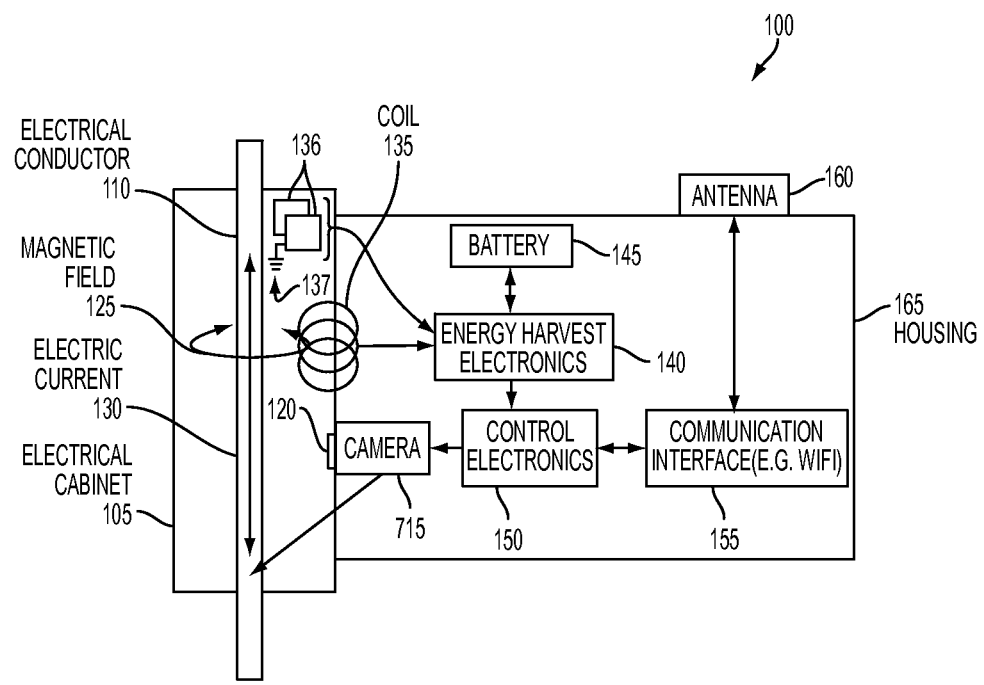
FIG. 10 illustrates an example monitoring system of the type shown in FIG. 1 having a multi-spectrum camera with thermal and non-thermal imaging capabilities in accordance with an embodiment of the disclosure.
Figure 11:
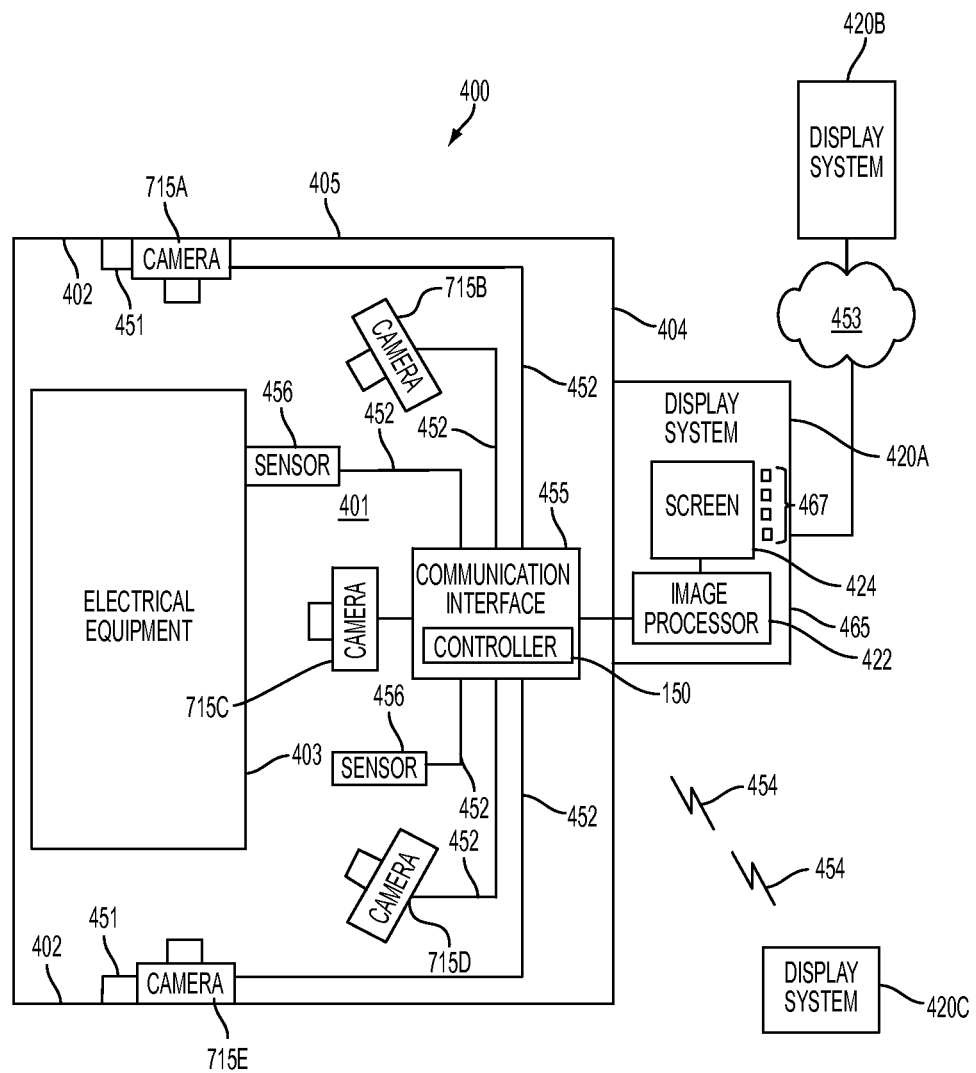
FIG. 11 illustrates an example monitoring system of the type shown in FIG. 4 having multi-spectrum cameras with thermal and non-thermal imaging capabilities in accordance with an embodiment of the disclosure.
Figure 12:
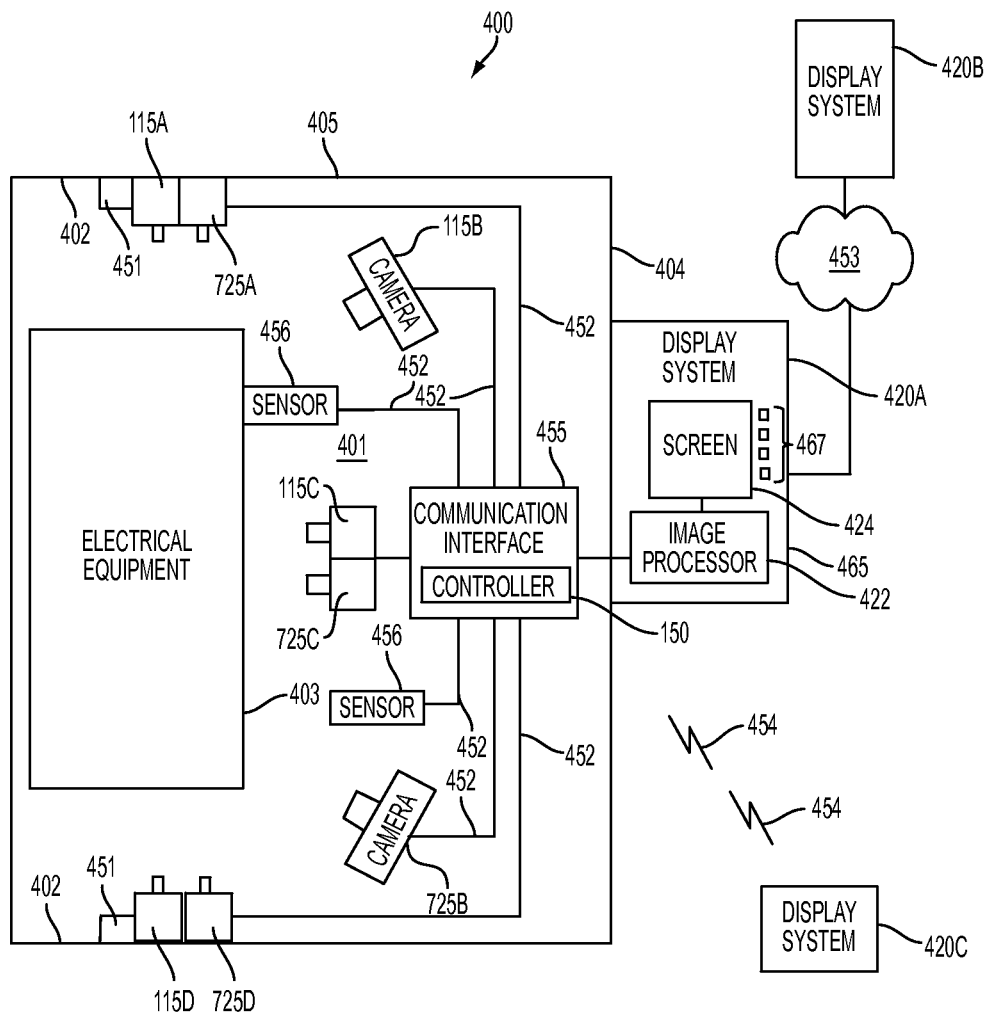
FIG. 12 illustrates another example monitoring system of the type shown in FIG. 4 having various cameras with thermal and non-thermal imaging capabilities in accordance with an embodiment of the disclosure.

FIGS. 10, 11, and 12 show exemplary embodiments in which monitoring systems described herein are provided with both thermal and non-thermal imaging capabilities.

As shown in FIG. 10, system 100 may be provided with a multi-spectrum camera such as multi-spectrum camera 715 in place of infrared camera 115. In general, camera 715 may be positioned, mounted and coupled to other components of system 100 in a similar fashion to infrared camera 115 of FIG. 1. For example, camera 715 may be arranged to harvest power from electrical components in cabinet 105 as described above in connection with camera 115 of FIG. 1. Camera 715 may capture and provide thermal images and non-thermal images to controller 150 for processing (e.g., combining).

As shown in FIG. 11, system 400 may be provided with multi-spectrum cameras 715A-E in place of cameras 115A-E of FIG. 4. Each camera 715 may be provided with one or more infrared cameras 115 and one or more non-thermal cameras 725. In general, cameras 715A-E may be positioned, mounted and coupled to other components of system 400 in a similar fashion to infrared cameras 115A-E of FIG. 4. Camera 715 may capture and provide thermal images and non-thermal images to image processor 422 for processing (e.g., combining). Combined images such as multi-spectrum images may be displayed by any of display systems 420 as described above in connection with, for example, FIGS. 4, 5, and 6. In some embodiments, multi-spectrum images may be stitched together to form a composite multi-spectrum image for display as described above in connection with image 550 of FIG. 6. However, the example of FIG. 11 in which all of infrared cameras 115 have been replaced with multi-spectrum cameras 715 is merely illustrative. If desired, system 400 may be provided with one or more multi-spectrum cameras 715, one or more infrared cameras 115 that are separate from multi-spectrum cameras 715, and/or one or more non-thermal cameras that are separate from multi-spectrum cameras 715.

In the example of FIG. 12, system 400 includes infrared cameras 115A, 115B, 115C, and 115D and non-thermal cameras 725A, 725B, 725C, and 725D. As shown, some infrared cameras 115 (e.g., infrared cameras 115A, 115C, and 115D) may have associated non-thermal cameras (e.g., non-thermal cameras 725A, 725C, and 725D). In addition, system 400 may include infrared cameras 115 (e.g., infrared camera 115B) that are not associated with any non-thermal cameras 725 and/or non-thermal cameras 725 (e.g., non-thermal camera 725B) that are not associated with any infrared cameras. In general, a monitoring system may be provided with any suitable combination of infrared and non-thermal cameras as desired for monitoring, for example, electrical equipment.

Infrared cameras that have associated non-thermal cameras (e.g., associated separate non-thermal cameras and/or non-thermal cameras in a common package) may have partially or completely overlapping fields of view with the associated non-thermal cameras to facilitate combination of captured thermal and non-thermal images.

Figure 13:
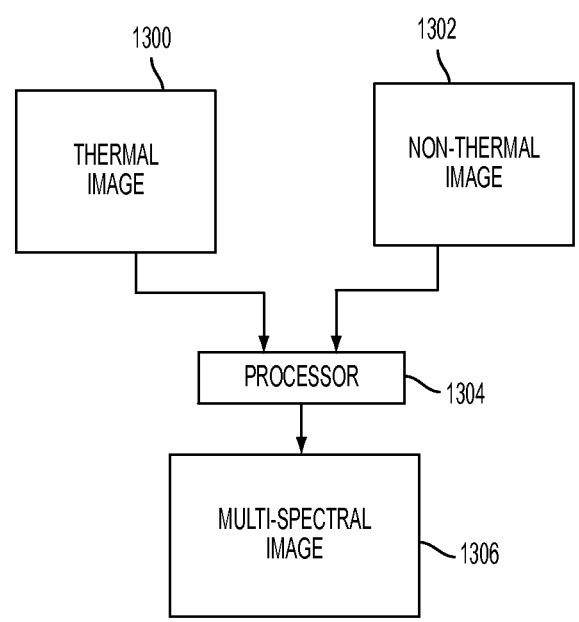
FIG. 13 illustrates a flow diagram showing how thermal and non-thermal images may be captured and combined in accordance with an embodiment of the disclosure.
Figure 14:
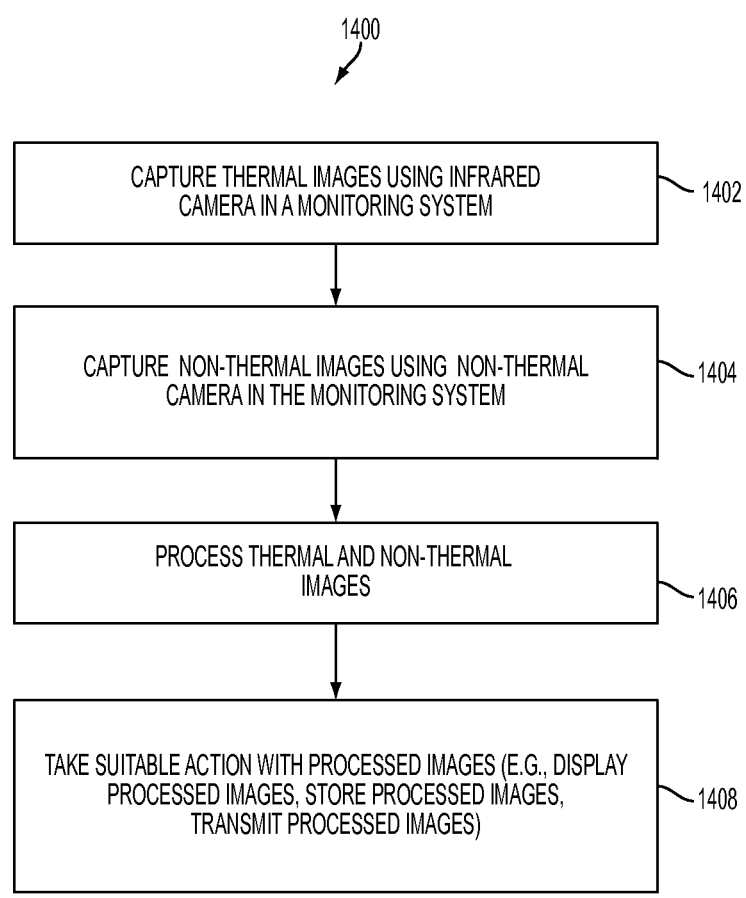
FIG. 14 illustrates a flow diagram of a process for capturing and combining thermal images and non-thermal images to form multi-spectrum images in accordance with an embodiment of the disclosure.

FIGS. 13 and 14 are illustrative of processes for combining infrared images (e.g., thermal images) and non-thermal images (e.g., visible light images, near-infrared images, short wave infrared images, and/or other non-thermal images).

As shown in FIG. 13, a thermal image 1300 and a non-thermal image 1302 may be provided to a processor such as processor 1304. In various embodiments, processor 1304 may be a processor associated with a monitoring system such as controller 150 of system 100 and/or image processor 422 of system 400.

Processor 1304 may be used to fuse, superimpose, or otherwise combine non-thermal image 1302 with thermal image 1304 as further described herein to form a processed image such as a multi-spectrum image 1306. Multi-spectrum image 1306 may be formed from a single thermal image 1304 and a single non-thermal image 1302, or multi-spectrum image 1306 may be a composite stitched image formed from multiple multi-spectrum images that have been captured by, for example, several multi-spectrum cameras that each view partially overlapping portions of electrical equipment in a cabinet. Multi-spectrum image 1306 may be provided to a display, stored in memory, or transmitted to external equipment (as examples).

FIG. 14 illustrates a flow diagram of a process 1400 for capturing and combining thermal and non-thermal images using a processor in a monitoring system.

At block 1402, thermal images may be captured using one or more infrared cameras in a monitoring system. Each thermal image may be captured at a focal plane array (FPA) of an infrared camera, such as those described herein. If desired, the thermal images may be captured using multiple infrared cameras that each view a portion of electrical equipment (for example) to be monitored.

At block 1404, non-thermal images may be captured using one or more non-thermal cameras, such as those described herein in the monitoring system. The non-thermal cameras may be formed separately in the monitoring system from the infrared cameras or may be formed in common packages with one or more infrared cameras in a multi-spectrum camera, such as those described herein. Capturing the non-thermal images may include capturing non-thermal images that overlap at least a portion of a thermal image.

At block 1406, the thermal and non-thermal images captured at blocks 1402 and 1404 may be processed. The thermal and non-thermal images may undergo individual processing operations and/or processing operations for combining, fusing, or superimposing the images to form multi-spectrum images. Processing the thermal and non-thermal images may include parallax corrections based on the distance between the non-thermal camera and the infrared camera that were used to capture the images. Processing the thermal and non-thermal images may include stitching together one or more thermal images, stitching together one or more non-thermal images, and/or stitching together one or more multi-spectrum images. Processing the thermal images may include image correction operations such as a NUC process as described herein.

At block 1408, suitable action may be taken with the processed images. Suitable action may include displaying the processed images, storing the processed images, and/or transmitting the processed images (e.g., to external equipment). Displaying the processed images may include displaying one or more thermal images and/or one or more stitched thermal images as described above in connection with FIGS. 5 and 6 (as examples), displaying one or more non-thermal images and/or one or more stitched non-thermal images, displaying one or more thermal images and one or more multi-spectrum images, displaying one or more multi-spectrum images, or displaying one or more stitched multi-spectrum images (as examples).

Figure 15:
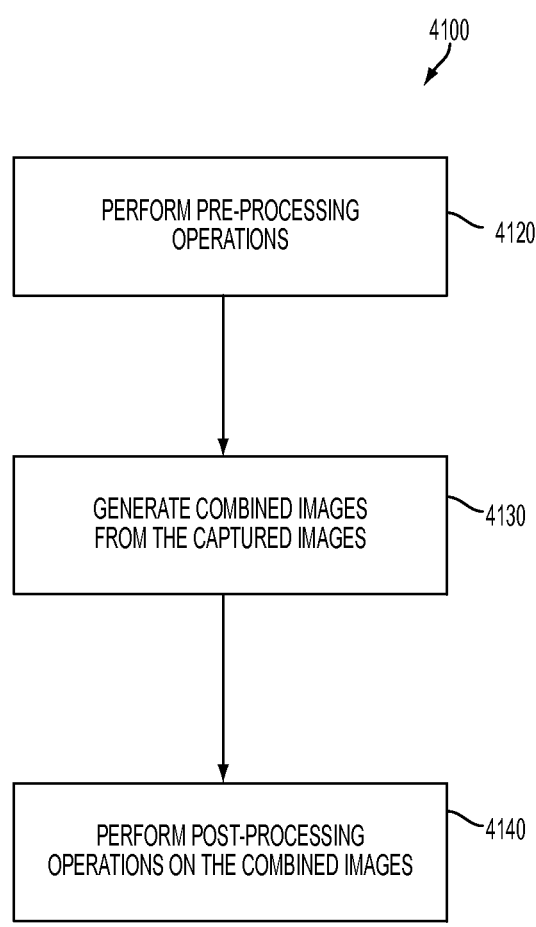
FIG. 15 illustrates a flow diagram of a process for processing thermal images and non-thermal images in accordance with an embodiment of the disclosure.
Figure 16:
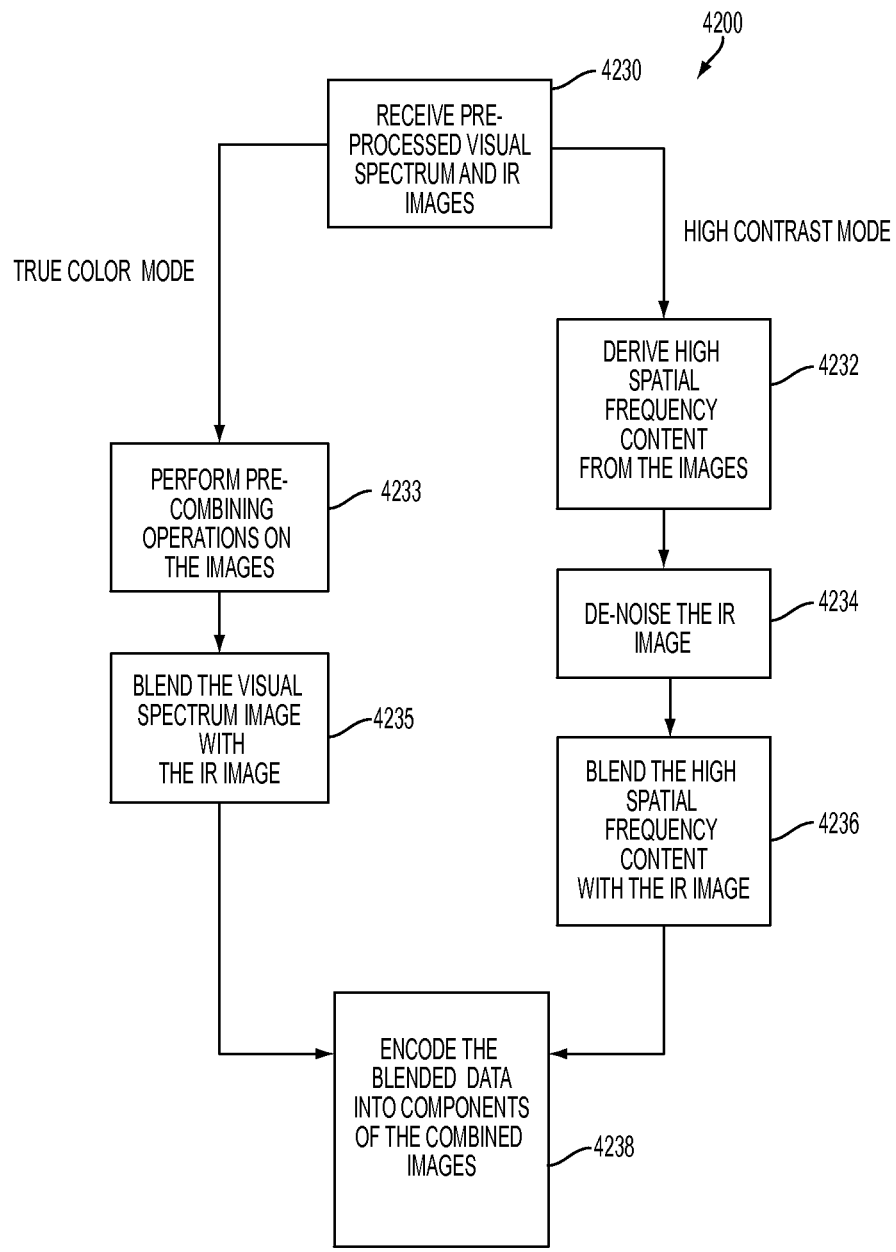
FIG. 16 illustrates a flow diagram of various operations to enhance infrared imaging of a scene in accordance with an embodiment of the disclosure.
Figure 17:
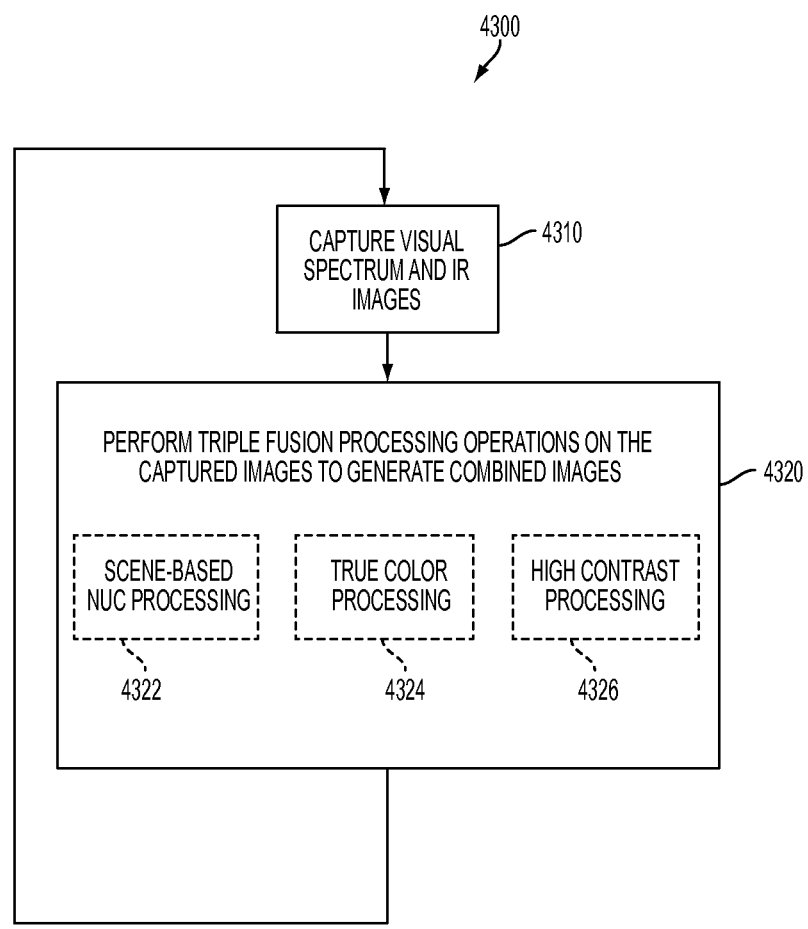
FIG. 17 illustrates a flow diagram of various operations to enhance infrared imaging of a scene in accordance with an embodiment of the disclosure.

In one suitable embodiment that is sometimes discussed herein as an example, infrared images such as thermal images can be processed and combined with visible light images (sometimes referred to herein as visible spectrum images). In this embodiment, non-thermal camera 725 may be a visible light camera configured to capture visible light images. However, it should be appreciated that examples discussed herein in which visible spectrum images are combined with infrared (e.g., thermal images) are merely illustrative and that the processes and methods described herein may be used to combine infrared (e.g., thermal) images with any suitable non-thermal images such as near-infrared images, short wave infrared images, EMCCD images, ICCD images, etc. FIGS. 15, 16, and 17 illustrate operations that may be performed for processing and/or combining thermal and visible spectrum images in this embodiment. It will therefore be appreciated that the operations described herein in connection with FIGS. 15, 16, and 17 for visible spectrum images may also be applied to non-thermal images other than visible spectrum images.

Turning now to FIG. 15, FIG. 15 illustrates a flow diagram of a process 4100 to process thermal and non-thermal images captured using a monitoring system in accordance with an embodiment of the disclosure. In some embodiments, process 4100 may be implemented as an embodiment of block 1406 in process 1400 of FIG. 14, for example, to generate processed images such as multi-spectrum images from captured infrared (e.g., thermal) and non-thermal images captured in blocks 1402 and 1404 in process 1400.

It should also be appreciated that any step, sub-step, sub-process, or block of process 4100 may be performed in an order or arrangement different from the embodiment illustrated by FIG. 15. In some embodiments, any portion of process 4100 may be implemented in a loop so as to continuously operate on a series of infrared and/or visible spectrum images, such as a video of a scene. In other embodiments, process 4100 may be implemented in a partial feedback loop including display of intermediary processing (e.g., after or while receiving infrared and/or visible spectrum images, performing preprocessing operations, generating combined images, performing post processing operations, or performing other processing of process 4100) to a user, for example, and/or including receiving user input, such as user input directed to any intermediary processing block.

At block 4120, pre-processing operations may be performed on one or more of the captured thermal and non-thermal images.

Preprocessing operations may include a variety of numerical, bit, and/or combinatorial operations performed on all or a portion of an image, such as on a component of an image, for example, or a selection of pixels of an image, or on a selection or series of images. In one embodiment, processing operations may include operations for correcting for differing FOVs and/or parallax resulting from imaging modules having different FOVs or non-co-linear optical axes. Such corrections may include image cropping, image morphing (e.g., mapping of pixel data to new positions in an image), spatial filtering, and resampling, for example. In another embodiment, a resolution of the visible spectrum and/or infrared images may be scaled to approximate or match a resolution of a corresponding image (e.g., visible spectrum to infrared, or infrared to visible spectrum), a portion of an image (e.g., for a picture-in-picture (PIP) effect), a resolution of a display, or a resolution specified by a user, monitoring system, or particular image processing block. Resolution scaling may include resampling (e.g., up-sampling or down-sampling) an image, for example, or may include spatial filtering and/or cropping an image.

In another embodiment, preprocessing operations may include temporal and/or spatial noise reduction operations, which may be performed on visible spectrum and/or infrared images, and which may include using a series of images, for example, provided by one or both of an infrared camera and a non-thermal camera such as a visible light camera. In a further embodiment, a NUC process may be performed on the captured and stored images to remove noise therein, for example, by using various NUC techniques disclosed herein. In another embodiment, other calibration processes for infrared images may be performed, such as profiling, training, baseline parameter construction, and other statistical analysis on one or more images. Calibration parameters resulting from such processes may be applied to images to correct, calibrate, or otherwise adjust radiometric data in infrared images, for example, or to correct color or intensity data of one or more visible spectrum images.

In one embodiment, an image may be analyzed to determine a distribution of intensities for one or more components of the image. An overall gain and/or offset may be determined for the image based on such a distribution, for example, and used to adjust the distribution so that it matches an expected (e.g., corrected) or desired (e.g., targeted) distribution. In other embodiments, an overall gain and/or offset may be determined so that a particular interval of the distribution utilizes more of the dynamic range of the particular component or components of the image.

In some embodiments, a dynamic range of a first image (e.g., a radiometric component of an infrared image such as a thermal image) may be normalized to the dynamic range of a second image (e.g., a luminance component of a visible spectrum image). In other embodiments, a dynamic range of a particular image may be adjusted according to a histogram equalization method, a linear scaling method, or a combination of the two, for example, to distribute the dynamic range according to information contained in a particular image or selection of images.

In further embodiments, adjustments and/or normalizations of dynamic ranges or other aspects of images may be performed while retaining a calibration of a radiometric component of an infrared image. For example, a dynamic range of a non-radiometric component of an infrared image may be adjusted without adjusting the dynamic range of the radiometric component of infrared image. In other embodiments, the radiometric component of an infrared image may be adjusted to emphasize a particular thermal interval, for example, and the adjustment may be stored with the infrared image so that accurate temperature correspondence (e.g., a pseudo-color and/or intensity correspondence) may be presented to a user along with a user-viewable image corresponding to the thermal image and/or a combined image including infrared characteristics derived from the infrared image.

In other embodiments, preprocessing operations may include converting visible spectrum and/or infrared images to a different or common color space. In other embodiments, images in a raw or uncompressed format may be converted to a common RGB or YCbCr color space. In some embodiments, a pseudo-color palette, such as a pseudo-color palette chosen by a user, may be applied as part of the preprocessing operations performed in block 4120. As with the dynamic range adjustments, application of color palettes may be performed while retaining a calibration of a radiometric component of an infrared image, for example, or a color space calibration of a visible spectrum image.

In another embodiment, preprocessing operations may include decomposing images into various components. For example, an infrared image in a color space/format including a raw or uncompressed radiometric component may be converted into an infrared image in a YCbCr color space. The raw radiometric component may be encoded into a luminance (e.g., Y) component of the converted infrared image, for example, or into a chrominance (e.g., Cr and/or Cb) component of the converted infrared image, or into the luminance and chrominance components of the converted infrared image. In some embodiments, unused components may be discarded, for example, or set to a known value (e.g., black, white, grey, or a particular primary color). Visible spectrum images may also be converted and decomposed into constituent components, for example, in a similar fashion. The decomposed images may be stored in place of the original images, for example, and may include context data indicating all color space conversions and decompositions so as to potentially retain a radiometric and/or color space calibration of the original images.

More generally, preprocessed images may be stored in place of original images, for example, and may include context data indicating all applied preprocessing operations so as to potentially retain a radiometric and/or color space calibration of the original images.

At block 4130, a monitoring system may generate one or more combined images such as multi-spectrum images from the captured and/or preprocessed images. Such combined images may serve to provide enhanced imagery as compared to imagery provided by the visible spectrum or infrared images alone.

In one embodiment, a processor of the system may generate combined images according to a true color mode. For example, a combined image may include a radiometric component of an infrared image blended with a corresponding component of a visible spectrum image according to a blending parameter. In such embodiments, the remaining portions of the combined image may be derived from corresponding portions of the visible spectrum and/or infrared images.

In another embodiment, the processor may be configured to generate combined images according to a high contrast mode. For example, a combined image may include a radiometric component of an infrared image and a blended component including infrared characteristics of the image blended with high spatial frequency content, derived from visible spectrum and/or infrared images, according to a blending parameter.

More generally, the processor may be configured to generate combined images that increase or refine the information conveyed by either the visible spectrum or infrared images viewed by themselves. Combined images may be stored, for example, for subsequent post-processing and/or presentation to a user of the monitoring system.

At block 4140, the processor may perform a variety of post-processing operations on combined images. Similar to the preprocessing operations described with respect to block 4120, post-processing operations may include a variety of numerical, bit, and/or combinatorial operations performed on all or a portion of an image, such as on a component of an image, for example, or a selection of pixels of an image, or on a selection or series of images. For example, any of the dynamic range adjustment operations described above with respect to preprocessing operations performed on captured images may also be performed on one or more combined images. In one embodiment, a particular color-palette, such as a night or day-time palette, or a pseudo-color palette, may be applied to a combined image. For example, a particular color-palette may be designated by a user, or may be determined by context or other data, such as a current time of day, a type of combined image, or a dynamic range of a combined image.

In other embodiments, post-processing operations may include adding high resolution noise to combined images in order to decrease an impression of smudges or other artifacts potentially present in the combined images. In one embodiment, the added noise may include high resolution temporal noise (e.g., "white" signal noise). In further embodiments, post-processing operations may include one or more noise reduction operations to reduce or eliminate noise or other non-physical artifacts introduced into the combined images by image processing, for example, such as aliasing, banding, dynamic range excursion, and numerical calculation-related bit-noise.

In some embodiments, post-processing operations may include color-weighted (e.g., chrominance-weighted) adjustments to luminance values of an image in order to ensure that areas with extensive color data are emphasized over areas without extensive color data. For example, where a radiometric component of an infrared image is encoded into a chrominance component of a combined image, in block 4130, for example, a luminance component of the combined image may be adjusted to increase the luminance of areas of the combined image with a high level of radiometric data. A high level of radiometric data may correspond to a high temperature or temperature gradient, for example, or an area of an image with a broad distribution of different intensity infrared emissions (e.g., as opposed to an area with a narrow or unitary distribution of intensity infrared emissions). Other normalized weighting schemes may be used to shift a luminance component of a combined image for pixels with significant color content. In alternative embodiments, luminance-weighted adjustments to chrominance values of an image may be made in a similar manner.

More generally, post-processing operations may include using one or more components of a combined image to adjust other components of a combined image in order to provide automated image enhancement. In some embodiments, post-processing operations may include adjusting a dynamic range, a resolution, a color space/format, or another aspect of combined images to match or approximate a corresponding aspect of a display, for example, or a corresponding aspect expected by a monitoring system or selected by a user.

Post-processed combined images may be stored in place of original combined images, for example, and may include context data indicating all applied post-processing operations so as to potentially retain a radiometric and/or color space calibration of the original combined images.

Turning now to FIG. 16, FIG. 16 illustrates a flow diagram of a process 4200 to enhance infrared imaging of a scene in accordance with an embodiment of the disclosure. In some embodiments, process 4200 may be implemented as an embodiment of block 4130 in process 4100 of FIG. 15, for example, to generate combined images from captured infrared and/or visible spectrum images received in blocks 1402 and 1404 in process 1400 of FIG. 14.

It should be appreciated that any step, sub-step, sub-process, or block of process 4200 may be performed in an order different from the embodiment illustrated by FIG. 16, and, furthermore, may be performed before, after, or within one or more blocks in process 4100 of FIG. 15, including blocks other than block 4130. For example, although process 4200 describes distinct blending and high-contrast modes, in other embodiments, captured images may be combined using any portion, order, or combination of the blending and/or high-contrast mode processing operations.

At block 4230, a processor of the monitoring system may receive preprocessed visible spectrum and infrared images (as examples). Once the visible spectrum and infrared images are received by the processor, the processor may be configured to determine a mode for generating combined images. Such mode may be selected by a user, for example, or may be determined according to context data or an alternating mode, for instance, where the mode of operation alternates between configured modes upon a selected schedule or a particular monitoring system expectation.

In the embodiment illustrated by FIG. 16, the processor may determine a true color mode, including one or more of blocks 4233 and 4235, or a high contrast mode, including one or more of blocks 4232, 4234, and 4236. In other embodiments, process 4200 may include other selectable modes including processes different from those depicted in FIG. 16, for example, or may include only a single mode, such as a mode including one or more adjustable blending parameters. In embodiments with multiple possible modes, once a mode is determined, process 4200 may proceed with the selected mode.

At block 4233, the system may perform various pre-combining operations on one or more of the visible spectrum and infrared images. For example, if a true color mode is determined in block 4230, the processor may be configured to perform pre-combining operations on one or more visible spectrum and/or infrared images received in block 4230. In one embodiment, pre-combining operations may include any of the pre-processing operations described with respect to block 4120 of FIG. 15. For example, the color spaces of the received images may be converted and/or decomposed into common constituent components.

In other embodiments, pre-combining operations may include applying a high pass filter, applying a low pass filter, a non-linear low pass filer (e.g., a median filter), adjusting dynamic range (e.g., through a combination of histogram equalization and/or linear scaling), scaling dynamic range (e.g., by applying a gain and/or an offset), and adding image data derived from these operations to each other to form processed images. For example, a pre-combining operation may include extracting details and background portions from a radiometric component of an infrared image using a high pass spatial filter, performing histogram equalization and scaling on the dynamic range of the background portion, scaling the dynamic range of the details portion, adding the adjusted background and details portions to form a processed infrared image, and then linearly mapping the dynamic range of the processed infrared image to the dynamic range of a display. In one embodiment, the radiometric component of the infrared image may be a luminance component of the infrared image. In other embodiments, such pre-combining operations may be performed on one or more components of visible spectrum images.

As with other image processing operations, pre-combining operations may be applied in a manner so as to retain a radiometric and/or color space calibration of the original received images. Resulting processed images may be stored and/or may be further processed according to block 4235.

At block 4235, the processor may blend one or more visible spectrum images (or other non-thermal images) with one or more infrared images. For example, the processor may be configured to blend one or more visible spectrum images with one or more infrared images, where the one or more visible spectrum and/or infrared images may be processed versions (e.g., according to block 4233) of images originally received in block 4230.

In one embodiment, blending may include adding a radiometric component of an infrared image to a corresponding component of a visible spectrum image, according to a blending parameter. For example, a radiometric component of an infrared image may be a luminance component (e.g., Y) of the infrared image. In such an embodiment, blending the infrared image with a visible spectrum image may include proportionally adding the luminance components of the images according to a blending parameter and the following first blending equation:

$$YCI = \zeta \ast YVSI + (1-\zeta) \ast YIRI$$

where YCI is the luminance component of the combined image, YVSI is the luminance component of the visible spectrum image, YIRI is the luminance component of the infrared image, and $\zeta$ varies from 0 to 1. In this embodiment, the resulting luminance component of the combined image is the blended image data.

In other embodiments, where a radiometric component of an infrared image may not be a luminance component of the infrared image, blending an infrared image with a visible spectrum image may include adding chrominance components of the images according to the first blending equation (e.g., by replacing the luminance components with corresponding chrominance components of the images), and the resulting chrominance component of the combined image is blended image data. More generally, blending may include adding (e.g., proportionally) a component of an infrared image, which may be a radiometric component of the infrared image, to a corresponding component of a visible spectrum image. Once blended image data is derived from the components of the visible spectrum and infrared images, the blended image data may be encoded into a corresponding component of the combined image, as further described with respect to block 4238. In some embodiments, encoding blended image data into a component of a combined image may include additional image processing steps, for example, such as dynamic range adjustment, normalization, gain and offset operations, and color space conversions, for instance.

In embodiments where radiometric data is encoded into more than one color space/format component of an infrared image, the individual color space/format components of the infrared and visible spectrum images may be added individually, for example, or the individual color space components may be arithmetically combined prior to adding the combined color space/format components.

In further embodiments, different arithmetic combinations may be used to blend visible spectrum and infrared images. For example, blending an infrared image with a visible spectrum image may include adding the luminance components of the images according to a blending parameter and the following second blending equation:

$$YCI = \zeta * YVSI + YIRI$$

where YCI, YVSI, and YIRI are defined as above with respect to the first blending equation, and $\zeta$ varies from 0 to values greater than a dynamic range of an associated image component (e.g., luminance, chrominance, radiometric, or other image component). As with the first blending equation, the second blending equation may be used to blend other components of an infrared image with corresponding components of a visible spectrum image. In other embodiments, the first and second blending equations may be rewritten to include per-pixel color-weighting or luminance-weighting adjustments of the blending parameter, for example, similar to the component-weighted adjustments described with respect to block 4140 of FIG. 15, in order to emphasize an area with a high level of radiometric data.

In some embodiments, image components other than those corresponding to a radiometric component of an infrared image may be truncated, set to a known value, or discarded. In other embodiments, the combined image components other than those encoded with blended image data may be encoded with corresponding components of either the visible spectrum or the infrared images. For example, in one embodiment, a combined image may include a chrominance component of a visible spectrum image encoded into a chrominance component of the combined image and blended image data encoded into a luminance component of the combined image, where the blended image data comprises a radiometric component of an infrared image blended with a luminance component of the visible spectrum image. In alternative embodiments, a combined image may include a chrominance component of the infrared image encoded into a chrominance component of the combined image.

A blending parameter value may be selected by a user, or may be determined by the processor according to context or other data, for example, or according to an image enhancement level expected by a coupled monitoring system. In some embodiments, the blending parameter may be adjusted or refined using a knob, joystick, or keyboard coupled to the processor, for example, while a combined image is being displayed by a display. From the first and second blending equations, in some embodiments, a blending parameter may be selected such that blended image data includes only infrared characteristics, or, alternatively, only visible spectrum characteristics.

In addition to or as an alternative to the processing described above, processing according to a true color mode may include one or more processing steps, ordering of processing steps, arithmetic combinations, and/or adjustments to blending parameters as disclosed in U.S. patent application Ser. No. 12/477,828 filed Jun. 3, 2009 which is hereby incorporated by reference in its entirety. For example, blending parameter $\zeta$ may be adapted to affect the proportions of two luminance components of an infrared image and a visible spectrum image. In one aspect, $\zeta$ may be normalized with a value in the range of 0 (zero) to 1, wherein a value of 1 produces a blended image (e.g., blended image data, and/or a combined image) that is similar to the visible spectrum image. On the other hand, if $\zeta$ is set to 0, the blended image may have a luminance similar to the luminance of the infrared image. However, in the latter instance, the chrominance (Cr and Cb) from the visible image may be retained. Each other value of $\zeta$ may be adapted to produce a blended image where the luminance part (Y) includes information from both the visible spectrum and infrared images. For example, $\zeta$ may be multiplied to the luminance part (Y) of the visible spectrum image and added to the value obtained by multiplying the value of $1-\zeta$ to the luminance part (Y) of the infrared image. This added value for the blended luminance parts (Y) may be used to provide the blended image (e.g., the blended image data, and/or the combined image).

In one embodiment, a blending algorithm may be referred to as true color infrared imagery. For example, in daytime imaging, a blended image may comprise a visible spectrum color image, which includes a luminance element and a chrominance element, with its luminance value replaced by the luminance value from an infrared image. The use of the luminance data from the infrared image causes the intensity of the true visible spectrum color image to brighten or dim based on the temperature of the object. As such, the blending algorithm provides IR imaging for daytime or visible light images.

After one or more visible spectrum images (or other non-thermal images) are blended with one or more infrared images such as thermal images, processing may proceed to block 4238, where blended data may be encoded into components of the combined images in order to form the combined images.

At block 4232, the processor may derive high spatial frequency content from one or more of the visible spectrum and infrared images. For example, if a high contrast mode is determined in block 4230, the processor may be configured to derive high spatial frequency content from one or more of the visible spectrum and infrared images received in block 4230.

In one embodiment, high spatial frequency content may be derived from an image by performing a high pass filter (e.g., a spatial filter) operation on the image, where the result of the high pass filter operation is the high spatial frequency content. In an alternative embodiment, high spatial frequency content may be derived from an image by performing a low pass filter operation on the image, and then subtracting the result from the original image to get the remaining content, which is the high spatial frequency content. In another embodiment, high spatial frequency content may be derived from a selection of images through difference imaging, for example, where one image is subtracted from a second image that is perturbed from the first image in some fashion, and the result of the subtraction is the high spatial frequency content. For example, optical elements of a camera may be configured to introduce vibration, focus/de-focus, and/or movement artifacts into a series of images captured by one or both of an infrared camera and a non-thermal camera. High spatial frequency content may be derived from subtractions of adjacent or semi-adjacent images in the series.

In some embodiments, high spatial frequency content may be derived from only the visible spectrum images or the infrared images. In other embodiments, high spatial frequency content may be derived from only a single visible spectrum or infrared image. In further embodiments, high spatial frequency content may be derived from one or more components of visible spectrum and/or infrared images, such as a luminance component of a visible spectrum image, for example, or a radiometric component of an infrared image. Resulting high spatial frequency content may be stored temporarily and/or may be further processed according to block 4234.

At block 4234, the processor may de-noise one or more infrared images. For example, the processor may be configured to de-noise, smooth, or blur one or more infrared images using a variety of image processing operations. In one embodiment, removing high spatial frequency noise from infrared images allows processed infrared images to be combined with high spatial frequency content derived according to block 4232 with significantly less risk of introducing double edges (e.g., edge noise) to objects depicted in combined images.

In one embodiment, removing noise from infrared images may include performing a low pass filter (e.g., a spatial and/or temporal filter) operation on the image, where the result of the low pass filter operation is a de-noised or processed infrared image. In a further embodiment, removing noise from one or more infrared images may include down-sampling the infrared images and then up-sampling the images back to the original resolution.

In another embodiment, processed infrared images may be derived by actively blurring infrared images. For example, optical elements of an infrared camera may be configured to slightly de-focus one or more infrared images captured by the infrared camera. The resulting intentionally blurred infrared images may be sufficiently de-noised or blurred so as to reduce or eliminate a risk of introducing double edges into combined images, as further described below. In other embodiments, blurring or smoothing image processing operations may be performed by the processor on infrared images received at block 4230 as an alternative or supplement to using optical elements to actively blur infrared images. Resulting processed infrared images may be stored temporarily and/or may be further processed according to block 4236.

At block 4236, the processor may blend high spatial frequency content with one or more infrared images. For example, the processor may be configured to blend high spatial frequency content derived in block 4232 with one or more infrared images, such as the processed infrared images provided in block 4234.

In one embodiment, high spatial frequency content may be blended with infrared images by superimposing the high spatial frequency content onto the infrared images, where the high spatial frequency content replaces or overwrites those portions of the infrared images corresponding to where the high spatial frequency content exists. For example, the high spatial frequency content may include edges of objects depicted in images, but may not exist within the interior of such objects. In such embodiments, blended image data may simply include the high spatial frequency content, which may subsequently be encoded into one or more components of combined images, as described in block 4238.

For example, a radiometric component of an infrared image may be a chrominance component of the infrared image, and the high spatial frequency content may be derived from the luminance and/or chrominance components of a visible spectrum image. In this embodiment, a combined image may include the radiometric component (e.g., the chrominance component of the infrared image) encoded into a chrominance component of the combined image and the high spatial frequency content directly encoded (e.g., as blended image data but with no infrared image contribution) into a luminance component of the combined image. By doing so, a radiometric calibration of the radiometric component of the infrared image may be retained. In similar embodiments, blended image data may include the high spatial frequency content added to a luminance component of the infrared images, and the resulting blended data encoded into a luminance component of resulting combined images.

In other embodiments, high spatial frequency content may be derived from one or more particular components of one or a series of visible spectrum and/or infrared images, and the high spatial frequency content may be encoded into corresponding one or more components of combined images. For example, the high spatial frequency content may be derived from a luminance component of a visible spectrum image, and the high spatial frequency content, which in this embodiment is all luminance image data, may be encoded into a luminance component of a combined image.

In another embodiment, high spatial frequency content may be blended with infrared images using a blending parameter and an arithmetic equation, such as the first and second blending equations, above. For example, in one embodiment, the high spatial frequency content may be derived from a luminance component of a visible spectrum image. In such an embodiment, the high spatial frequency content may be blended with a corresponding luminance component of an infrared image according to a blending parameter and the second blending equation to produce blended image data. The blended image data may be encoded into a luminance component of a combined image, for example, and the chrominance component of the infrared image may be encoded into the chrominance component of the combined image. In embodiments where the radiometric component of the infrared image is its chrominance component, the combined image may retain a radiometric calibration of the infrared image. In other embodiments, portions of the radiometric component may be blended with the high spatial frequency content and then encoded into a combined image.

More generally, the high spatial frequency content may be derived from one or more components of a visible spectrum image and/or an infrared image. In such an embodiment, the high spatial frequency content may be blended with one or more components of the infrared image to produce blended image data (e.g., using a blending parameter and a blending equation), and a resulting combined image may include the blended image data encoded into corresponding one or more components of the combined image. In some embodiments, the one or more components of the blended data do not have to correspond to the eventual one or more components of the combined image (e.g., a color space/format conversion may be performed as part of an encoding process).

A blending parameter value may be selected by a user or may be automatically determined by the processor according to context or other data, for example, or according to an image enhancement level expected by a coupled monitoring system. In some embodiments, the blending parameter may be adjusted or refined using a knob coupled to the processor, for example, while a combined image is being displayed by a display. In some embodiments, a blending parameter may be selected such that blended image data includes only infrared characteristics, or, alternatively, only visible spectrum characteristics. A blending parameter may also be limited in range, for example, so as not to produce blended data that is out-of-bounds with respect to a dynamic range of a particular color space/format or a display.

In addition to or as an alternative to the processing described above, processing according to a high contrast mode may include one or more processing steps, ordering of processing steps, arithmetic combinations, and/or adjustments to blending parameters as disclosed in U.S. patent application Ser. No. 13/437,645 filed Apr. 2, 2012 which is hereby incorporated by reference in its entirety. For example, the following equations may be used to determine the components Y, Cr and Cb for the combined image with the Y component from the high pass filtered visible spectrum image and the Cr and Cb components from the infrared image.

$$hp\_y\_vis = \text{highpass}(y\_vis)$$

$$(y\_ir, cr\_ir, cb\_ir) = \text{colored}(\text{lowpass}(ir\_signal\_linear))$$

which in another notation could be written as:

$$hp_{y_{vis}} = \text{highpass}(y_{vis})$$

$$(y_{ir}, cr_{ir}, cb_{ir}) = \text{colored}(\text{lowpass}(ir_{signal\ linear}))$$

In the above equations, highpass(y_vis) may be high spatial frequency content derived from high pass filtering a luminance component of a visible spectrum image. Colored (lowpass(ir_signal_linear)) may be the resulting luminance and chrominance components of the infrared image after the infrared image is low pass filtered. In some embodiments, the infrared image may include a luminance component that is selected to be 0.5 times a maximum luminance (e.g., of a display and/or a processing step). In related embodiments, the radiometric component of the infrared image may be the chrominance component of the infrared image. In some embodiments, the y_ir component of the infrared image may be dropped and the components of the combined image may be (hp_y_vis, cr_ir, cb_ir), using the notation above.

In another embodiment, the following equations may be used to determine the components Y, Cr and Cb for a combined image with the Y component from the high pass filtered visible spectrum image and the Cr and Cb components from the infrared image.

$$comb\_y = y\_ir + \text{alpha} \times hp\_y\_vis$$

$$comb\_cr = cr\_ir$$

$$comb\_cb = cb\_ir$$

which in another notation could be written as:

$$comb_y = y_{ir} + \text{alpha} \times hp_{y_{vis}}$$

$$comb_{cr} = cr_{ir}$$

$$comb_{cb} = cb_{ir}$$

The variation of alpha thus gives the user an opportunity to decide how much contrast is needed in the combined image. With an alpha of close to zero, the IR image alone will be shown, but with a very high alpha, very sharp contours can be seen in the combined image. Theoretically, alpha can be an infinitely large number, but in practice a limitation will probably be necessary, to limit the size of alpha that can be chosen to what will be convenient in the current application. In the above equations, alpha may correspond to a blending parameter $\zeta$.

Once the high spatial frequency content is blended with one or more infrared images, processing may proceed to block 4238, where blended data may be encoded into components of the combined images in order to form the combined images.

At block 4238, the processor may encode the blended data into one or more components of the combined images. For example, the processor may be configured to encode blended data derived or produced in accordance with blocks 4235 and/or 4236 into a combined image that increases, refines, or otherwise enhances the information conveyed by either the visible spectrum or infrared images viewed by themselves.

In some embodiments, encoding blended image data into a component of a combined image may include additional image processing steps, for example, such as dynamic range adjustment, normalization, gain and offset operations, noise reduction, and color space conversions, for instance.

In addition, the processor may be configured to encode other image data into combined images. For example, if blended image data is encoded into a luminance component of a combined image, a chrominance component of either a visible spectrum image or an infrared image may be encoded into a chrominance component of a combined image. Selection of a source image may be made through user input, for example, or may be determined automatically based on context or other data. More generally, in some embodiments, a component of a combined image that is not encoded with blended data may be encoded with a corresponding component of a visible spectrum image or an infrared image. By doing so, a radiometric calibration of an infrared image and/or a color space calibration of a visible spectrum image may be retained in the resulting combined image. Such calibrated combined images may be used for enhanced infrared imaging applications, particularly where constituent visible spectrum images and infrared images of a scene are captured at different times and/or disparate ambient lighting levels.

Turning now to FIG. 17, FIG. 17 illustrates a flowchart of a process 4300 to enhance infrared imaging of a scene in accordance with an embodiment of the disclosure.

It should be appreciated that any step, sub-step, sub-process, or block of process 4300 may be performed in an order different from the embodiment illustrated by FIG. 17, and, furthermore, may be performed before, after, or in parallel with one or more blocks in process 4100 of FIG. 15 and/or process 4200 of FIG. 16.

At block 4310, a processor of a monitoring system may capture visible spectrum images (or other non-thermal images) and infrared images (e.g., thermal images). In some embodiments, block 4310 may correspond to one or more of blocks 1402 and 1404 of process 1400 in FIG. 14. Once at least one visible spectrum image and/or infrared image is captured, process 4300 may continue to block 4320.

At block 4320, the processor may perform triple fusion processing operations on one or more captured images to generate combined images (e.g., at least three processes performed on such images in some embodiments). For example, the processor may be configured to perform adjustable scene-based NUC processing (e.g., block 4322), true color processing (e.g., block 4324), and high contrast processing (e.g., block 4326) on one or more images captured in block 4310, and then generate corresponding combined images including relative contributions of the various processing operations. In some embodiments, the relative contributions to the combined images may be determined by one or more control parameters. In such embodiments, control parameters may be determined from one or more user inputs, threshold values, and/or from other operating parameters of the monitoring system. In some embodiments, greater or fewer than three processing operations may be performed in block 4320. In some embodiments, other processing operations may be performed in block 4320 instead of and/or in addition to the illustrated operations.

For example, a relative contribution of a particular processing operation may include one or more components of an intermediary image, such as a result of a true color processing operation (e.g., processing according to a true color mode in FIG. 16), for example, multiplied by a corresponding control parameter. The one or more control parameters used to determine the relative contributions may be interdependent, for example, so that a resulting combined image from block 4320 includes image components (e.g., luminance, chrominance, radiometric, or other components) within a dynamic range of a particular display or a dynamic range expected by a communicatively coupled monitoring system, for instance. In other embodiments, one control parameter may be used to arithmetically determine all relative contributions, similar to various blending processing operations described herein. In further embodiments, multiple control parameters may be used to determine one or more relative contributions and post-processing operations (e.g., similar to embodiments of block 4140 of FIG. 15) may be used to adjust a dynamic range of a resulting combined image appropriately.

In still further embodiments, control parameters may be determined on a pixel-by-pixel basis, using threshold values, for example. Such threshold values may be used to compensate for too low and/or too high luminosity and/or chrominance values of intermediary and/or combined images, for example, or to select portions of intermediary images associated with particular control parameters and/or relative contributions. For example, in one embodiment, one or more threshold values may be used to apply a control parameter of 0.75 (e.g., 75% of the total contribution to a combined image) to portions of a true color processed intermediary image with luminance values above a median value (e.g., the threshold value in this embodiment), and apply a control parameter of 0.25 (e.g., 25% of the total contribution to the combined image) to portions of the true color processed intermediary image with luminance values below the median value.

In one embodiment, the processor may be configured to receive control parameters for processing captured images from memory of the system, derive color characteristics of an imaged scene from at least one captured visible spectrum image and/or infrared image, derive high spatial frequency content from at least one captured visible spectrum image and/or infrared image (e.g., which may be the same or different from the image(s) used to derive the color characteristics of the scene), and generate a combined image including relative contributions of the color characteristics and the high spatial frequency content that are determined by one or more of the control parameters.

In some embodiments, deriving color characteristics of a scene (e.g., true color processing 4324) may involve one or more processing steps similar to those discussed in reference to blocks 4233, 4235, and 4238 (e.g., a true color mode) of FIG. 16. In other embodiments, deriving high spatial frequency content (e.g., high contrast processing 4326) may involve one or more processing steps similar to those discussed in reference to blocks 4232, 4234, 4236, and 4238 (e.g., a high contrast mode) of FIG. 16. In further embodiments, any one or combination of scene-based NUC processing 4322, true color processing 4324, and high contrast processing 4326 may include one or more processing steps the same and/or similar to those discussed in reference to blocks 4120-4140 of FIG. 15. In addition, other image analytics and processing may be performed in place of or in addition to blocks 4322, 4324, and/or 4326, according to methodologies provided in U.S. patent application Ser. No. 12/477,828 filed Jun. 3, 2009 and/or U.S. patent application Ser. No. 13/437,645 filed Apr. 2, 2012, both of which are hereby incorporated by reference in their entirety.

In one embodiment the processor may be configured to selectively apply scene-based NUC processing to one or more infrared images by enabling or disabling the correction, for example, or by implementing corrections according to an overall gain applied to all or at least a portion of the correction terms. In some embodiments, the selectivity may be related to (e.g., proportional to) a control parameter, for example. In another embodiment, an infrared camera may be configured to selectively apply scene-based NUC processing to one or more infrared images.

In some embodiments, true color processing 4324 may include deriving color characteristics of the scene from a chrominance component of a visible spectrum image of the scene captured by visible spectrum imaging module such as a non-thermal camera in the monitoring system. In such embodiments, a combined image may include a relative contribution from a luminance component of an infrared image, where the relative contribution (e.g., its multiplicative factor, gain, or strength) of the luminance component of the infrared image substantially matches the relative contribution of the color characteristics. In some embodiments, the control parameter determining the relative contribution of the color characteristics may be used to determine the relative contribution of the luminance component of the infrared image. In further embodiments, the luminance component of the infrared image may be blended with a luminance component of the visible spectrum image before the resulting blended image data is contributed to the combined image in place of the luminance component of the infrared image. In various embodiments, a luminance component of the infrared image may correspond to a radiometric component of the infrared image.

In some embodiments, high contrast processing 4326 may include deriving high spatial frequency content from a luminance component of a visible spectrum (or other non-thermal image). In such embodiments, a combined image may include a relative contribution from a chrominance component of an infrared image, where the relative contribution of the chrominance component of the infrared image substantially matches the relative contribution of the high spatial frequency content. In some embodiments, the control parameter determining the relative contribution of the high spatial frequency content may be used to determine the relative contribution of the chrominance component of the infrared image. In further embodiments, high spatial frequency content may be blended with a luminance component of the infrared image before the resulting blended image data is contributed to the combined image in place of the high spatial frequency content. In various embodiments, a chrominance component of the infrared image may correspond to a radiometric component of the infrared image.

In various embodiments, the processing of blocks 4322, 4324, and 4326 may be performed in any desired order (e.g., serial, parallel, or combinations thereof).

Figure 18:
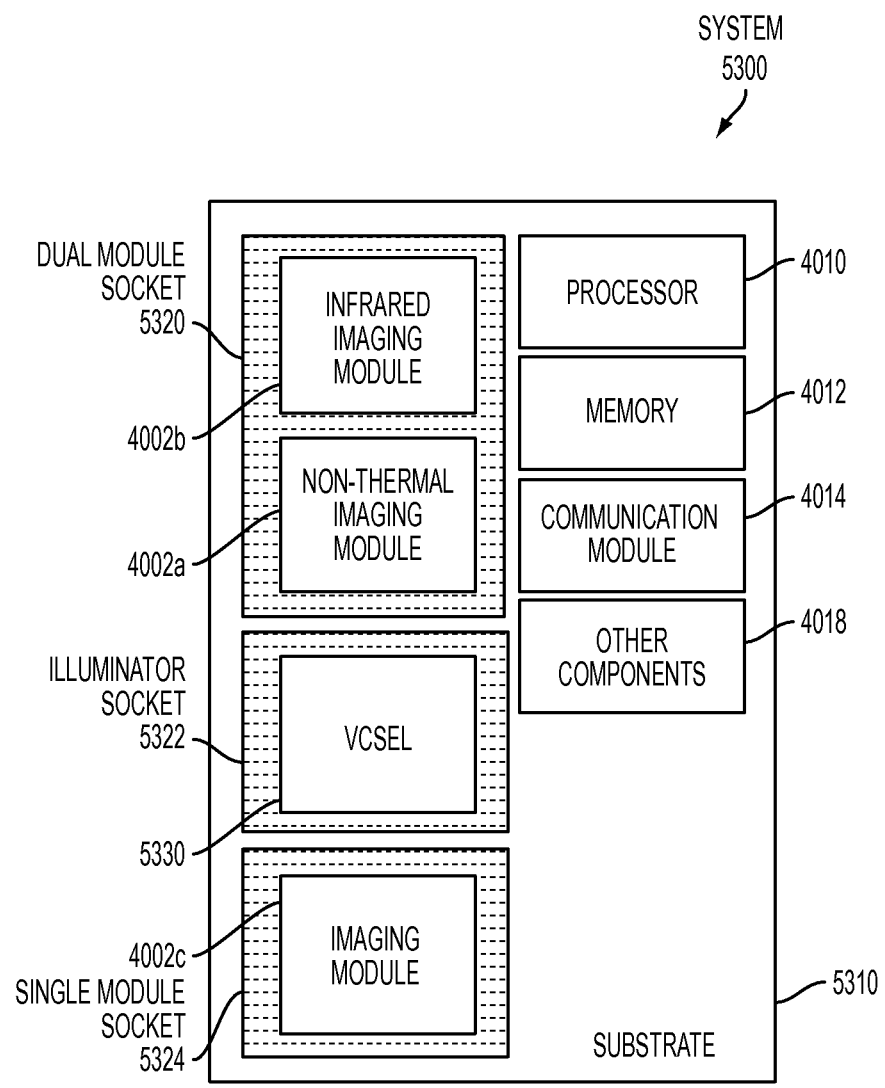
FIG. 18 illustrates a block diagram of an imaging system adapted to image a scene in accordance with an embodiment of the disclosure.

FIG. 18 illustrates a block diagram of a compact imaging system adapted to image a scene in accordance with an embodiment of the disclosure. For example, system 5300 of FIG. 18 may be an embodiment of multi-spectrum camera 715 (see, e.g., FIGS. 7-11).

In the embodiment shown in FIG. 18, system 5300 includes dual module socket 5320 physically coupled to common substrate 5310 and adapted to receive two imaging modules such as infrared imaging module 4002b and non-thermal imaging module 4002a and align them to each other. In one embodiment, infrared imaging module 4002b may be an embodiment of infrared camera 115 and non-thermal imaging module 4002a may be an embodiment of non-thermal camera 725 (see, e.g., FIG. 7). In further embodiments, dual module socket 5320 may include retainer springs, clips, or other physical restraint devices adapted to visibly indicate proper insertion of imaging modules through their physical arrangement or shape. In further embodiments, dual module socket 5320 may be adapted to provide one or more of tip, tilt, or rotational alignment of imaging modules 4002a-b that is greater (e.g., more aligned) than if the imaging modules are directly soldered to common substrate 5310 or if they are inserted into multiple single module sockets. Dual module socket 5320 may include common circuitry and/or common restrain devices used to service imaging modules 4002a-b, thereby potentially reducing an overall size of system 5300 as compared to embodiments where imaging modules 4002a-b have individual sockets. Additionally, dual module socket 5320 may be adapted to reduce a parallax error between images captured by imaging modules 4002a-b by spacing the imaging modules closer together.

Also shown is single module socket 5324 receiving imaging module 4002c spaced from dual module socket 5320 and imaging modules 4002a-b. Imaging module 4002c may be sensitive to a spectrum that is the same as, that overlaps, or is different from that sensed by either or both of imaging modules 4002a-b, for example. In embodiments where imaging module 4002c is sensitive to a spectrum in common with either of imaging modules 4002a-b, system 5300 may be adapted to capture additional images of a commonly viewed scene and image portions of the scene in stereo (e.g., 3D) in that spectrum. In such embodiments, the spatial distance between imaging module 4002c and either of imaging modules 4002a-b increases the acuity of the stereo imaging by increasing the parallax error. In some embodiments, system 5300 may be configured to generate combined images including stereo imaging characteristics and/or multi-spectrum characteristics of a commonly-viewed scene derived from one or more images captured by imaging modules 4002a-c. In other embodiments, stereo imaging may be used to determine distances to objects in a scene, to determine autofocus parameters, to perform a range calculation, to automatically adjust for parallax error, to generate images of range-specific atmospheric adsorption of infrared and/or other spectrums in a scene, and/or for other stereo-imaging features.

In embodiments where imaging module 4002c is sensitive to a spectrum outside that sensed by imaging modules 4002a-b, system 5300 may be configured to generate combined images including characteristics of a scene (e.g., a scene including some or all of electrical equipment to be monitored) derived from three different spectral views of the scene.

Although system 5300 is depicted with dual module socket 5320 separate from single module socket 5324, in other embodiments, system 5300 may include a triple (or higher order) module socket adapted to receive three or more imaging modules. Moreover, where compactness is desired, adjacent modules may be arranged in a multi-level staggered arrangement such that their optical axes are placed closer together than their planar area would normally allow. For example, dual module socket 5320 may be adapted to receive non-thermal imaging module 4002a on a higher (e.g., up out of the page of FIG. 18) level than infrared imaging modules 4002b and overlap non-optically sensitive areas of infrared imaging module 4002b.

Additionally shown in FIG. 18 is illuminator socket 5322 receiving illuminator module/vertical-cavity surface-emitting laser (VCSEL) 5330. System 5300 may be configured to use VCSEL 5330 to illuminate at least portions of a scene in a spectrum sensed by one or more of imaging modules 4002a-c. In some embodiments, VCSEL 5330 may be selectively tunable and/or directionally aimed by coupled microelectromechanical lenses and other systems controlled by one or more of processor 4010 and imaging modules 4002a-c. Illuminator socket 5322 may be implemented to have the same or similar construction as single module socket 5324, for example, or may be implemented as a multi-module socket. In some embodiments, a thermal image may be used to detect a "hot" spot in an image, such as an image of a breaker box. An illuminator module may be used to illuminate a label of a breaker to potentially pin point the cause of the hot spot. In some embodiments, stereo imaging may be used to determine aiming points for VCSEL 5330.

In some embodiments, any one of processor 4010 and imaging modules 4002a-c may be configured to receive user input (e.g., from one or more of other components 4018, a touch sensitive display coupled to system 5300, and/or any of the various user input devices discussed herein) indicating a portion of interest imaged by a first imaging module (e.g., infrared imaging module 4002b), control the illumination module (e.g., VCSEL 5330) to illuminate at least the portion-of-interest in a spectrum sensed by a second imaging module (e.g., non-thermal imaging module 4002a), receive illuminated captured images of the portion-of-interest from the second imaging module, and generate a combined image comprising illuminated characteristics of the scene derived from the illuminated captured images.

In the embodiment shown in FIG. 18, system 5300 also includes a processor 4010, a memory 4012, a communication module 4014, and other components 4018, any of which may be implemented in accordance with the various technologies described herein.

It should be appreciated that system 5300 may be provided with or without any or all of components 5330, 4010, 4012, 4014, and/or 4018. For example, processing, storage, input/output and communications for imaging modules 4002a-c and/or VCSEL 5330 may be provided by a larger system such as monitoring system 100 or monitoring system 400 in which system 5300 is implemented.

Figure 19:
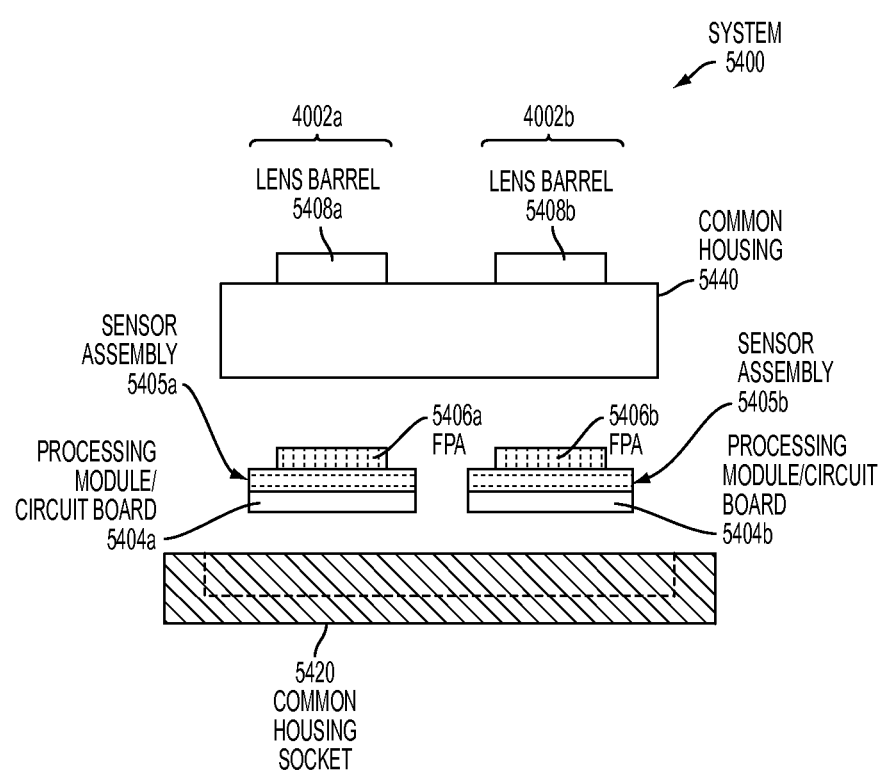
FIG. 19 illustrates a block diagram of a mounting system for imaging modules adapted to image a scene in accordance with an embodiment of the disclosure.

FIG. 19 illustrates a block diagram of a mounting system 5400 for imaging modules adapted to image a scene in accordance with an embodiment of the disclosure. For example, imaging modules 4002a-b (e.g., an infrared camera and a non-thermal camera of a monitoring system) may be implemented with a common housing to make their placement within a multi-spectrum camera such as camera 715 more compact and/or more aligned. As shown in FIG. 19, system 5400 may include common housing socket 5420, processing modules 5404a-b, sensor assemblies 5405a-b, FPAs 5406a-b, common housing 5440, and lens barrels 5408a-b (e.g., similar to lens barrel 210 in FIG. 2). Common housing 5440 may be used to further align, for example, components of imaging modules 4002a-b with their optical axes, rather than individual imaging modules. In the embodiment shown in FIG. 19, the imaging modules are covered by a common imaging module housing. In other embodiments, common housing 5440 may be placed over entire imaging modules 4002a-b (e.g., that retain their own individual housings), and may be part of a housing for a portable host system, for example.

Figure 20:
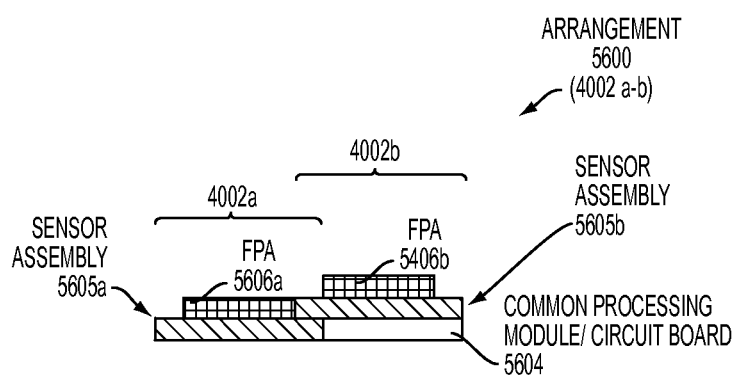
FIG. 20 illustrates a block diagram of an arrangement of an imaging module adapted to image a scene in accordance with an embodiment of the disclosure.

FIG. 20 illustrates a block diagram of an arrangement 5600 of imaging modules adapted to image a scene in accordance with an embodiment of the disclosure. For example, in FIG. 20, at least portions of two imaging modules 4002a-b may be arranged in a staggered arrangement, where portions of sensor assembly 5605b of imaging module 4002b (e.g., potentially including FPA 5606b) overlap portions of sensor assembly 5605a of imaging module 4002a (e.g., but not overlap any portion of FPA 5606a).

In some embodiments, imaging modules 4002a-b may be implemented with a common processing module/circuit board 5604 (e.g., similar to processing module 260 and circuit board 270 in FIG. 2, in some embodiments). Common processing module/circuit board 5604 may be implemented as any appropriate processing device (e.g., logic device, microcontroller, processor, ASIC, a digital signal processor (DSP), an image signal processor (ISP), or other device, including multi-channel implementations of the above) able to execute instructions and/or perform image processing operations as described herein. In some embodiments, common processing module/circuit board 5604 may be adapted to use the MIPI® standard, for example, and/or to store non-thermal images (e.g., visible spectrum images) and infrared images (e.g., thermal images) to a common data file using a common data format, as described herein.

Although various monitoring systems have been described with regard to electrical cabinets, the techniques described herein may be used in any environment where monitoring of thermal images may be useful, such as the monitoring of electrical equipment in data centers or other appropriate locations.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa. Moreover, the various technologies described herein with regard to some components may be applied to other components as appropriate.

Software in accordance with the present disclosure, such as program code and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system comprising:
   an infrared camera configured to capture a thermal image of at least a portion of electrical equipment positioned in an interior cavity of a cabinet;
   a non-thermal camera configured to capture a non-thermal image of at least the portion of the electrical equipment positioned in the interior cavity of the cabinet;
   a communication interface, configured to transmit the thermal image and the non-thermal image;
   a processor configured to generate a combined image comprising visible spectrum characteristics derived from the transmitted non-thermal image with thermal characteristics derived from a radiometric component of the transmitted thermal image;
   an electromagnetic coupler configured to receive electromagnetic energy in response to a current flow through at least one conductor of the electrical equipment within the cabinet;
   an energy harvesting circuit configured to provide electrical power in response to the electromagnetic energy received by the electromagnetic coupler; and
   a battery configured to store the electrical power provided by the energy harvesting circuit and to power the infrared camera and the non-thermal camera by the stored electrical power.

2. The system of claim 1, wherein the combined image comprises:
   high spatial frequency content of the non-thermal image encoded into a luminance component of the combined image; and
   the radiometric component encoded into the luminance component of the combined image and/or encoded into a chrominance component of the combined image.

3. The system of claim 1, wherein:
   the combined image comprises a chrominance component of the non-thermal image encoded into a chrominance component of the combined image;
   the radiometric component comprises a luminance component of the thermal image;
   the combined image comprises blended image data comprising the radiometric component and a luminance component of the visible spectrum image; and
   the blended image data is encoded into a luminance component of the combined image.

4. The system of claim 1, further comprising a user-viewable screen configured to display the combined image.

5. The system of claim 4, wherein the user-viewable screen is mounted on an exterior surface of the cabinet.

6. The system of claim 4, wherein the user-viewable screen is remote from the cabinet.

7. The system of claim 1, further comprising:
an additional infrared camera configured to capture an additional thermal image of a corresponding portion of the electrical equipment;
an additional non-thermal camera configured to capture an additional non-thermal image of the corresponding portion of the electrical equipment; and
wherein the communication interface is configured to transmit the additional thermal image and the additional non-thermal image for external viewing by the user.

8. The system of claim 1, wherein the non-thermal camera comprises a visible light camera.

9. The system of claim 1, wherein:
the thermal image is an unblurred thermal image of at least the portion of the electrical equipment; and
the system further comprises a processor configured to:
determine a plurality of non-uniform correction (NUC) terms based on intentionally blurred thermal images captured by the thermal camera, and
apply the NUC terms to the unblurred thermal image to remove noise from the unblurred thermal image.

10. The system of claim 1, wherein:
the infrared camera and the non-thermal camera are co-located within the cabinet; and
the electromagnetic coupler comprises:
a coil comprising a resonant tank circuit,
an inductive coil, and/or
a plurality of conductive plates.

11. A method comprising:
capturing, by an infrared camera, a thermal image of at least a portion of electrical equipment positioned in an interior cavity of a cabinet;
capturing, by a non-thermal camera, a non-thermal image of at least the portion of the electrical equipment positioned in the interior cavity of the cabinet;
transmitting, by a communication interface, the thermal image and the non-thermal image;
generating a combined image comprising visible spectrum characteristics derived from the transmitted non-thermal image with thermal characteristics derived from a radiometric component of the transmitted thermal image;
receiving, by an electromagnetic coupler, electromagnetic energy in response to a current flow through at least one conductor of the electrical equipment within the cabinet;
providing, by an energy harvesting circuit, electrical power in response to the electromagnetic energy received by the electromagnetic coupler;
storing, by a battery, the electrical power provided by the energy harvesting circuit; and
powering, by the electrical power stored by the battery, the infrared camera and/or non-thermal camera.

12. The method of claim 11, wherein the combined image comprises:
high spatial frequency content of the non-thermal image encoded into a luminance component of the combined image; and
the radiometric component encoded into the luminance component of the combined image and/or encoded into a chrominance component of the combined image.

13. The method of claim 11, wherein:
the combined image comprises a chrominance component of the non-thermal image encoded into a chrominance component of the combined image;
the radiometric component comprises a luminance component of the thermal image;
the combined image comprises blended image data comprising the radiometric component and a luminance component of the visible spectrum image; and
the blended image data is encoded into a luminance component of the combined image.

14. The method of claim 11, further comprising displaying the combined image on a user-viewable screen.

15. The method of claim 14, wherein the user-viewable screen is mounted on an exterior surface of the cabinet.

16. The method of claim 14, wherein the user-viewable screen is remote from the cabinet.

17. The method of claim 11, further comprising:
capturing, by an additional infrared camera, an additional thermal image of a corresponding portion of the electrical equipment;
capturing, by an additional non-thermal camera, an additional non-thermal image of the corresponding portion of the electrical equipment; and
transmitting, by the communication interface, the additional thermal image and the additional non-thermal image for external viewing by the user.

18. The method of claim 11, wherein the non-thermal camera comprises a visible light camera.

19. The method of claim 11, wherein:
the thermal image is an unblurred thermal image of at least the portion of the electrical equipment; and
the method further comprises:
determining a plurality of non-uniform correction (NUC) terms based on intentionally blurred thermal images captured by the thermal camera, and
applying the NUC terms to the unblurred thermal image to remove noise from the unblurred thermal image.

20. The method of claim 11, wherein:
the infrared camera and the non-thermal camera are co-located within the cabinet; and
the electromagnetic coupler comprises:
a coil comprising a resonant tank circuit,
an inductive coil, and/or
a plurality of conductive plates.

* * * * *

UNITED STATES PATENT AND TRADEMARK OFFICE
CERTIFICATE OF CORRECTION

PATENT NO. : 10,841,508 B2
APPLICATION NO. : 14/748542
DATED : November 17, 2020
INVENTOR(S) : Thomas J. Scanlon et al.

It is certified that error appears in the above-identified patent and that said Letters Patent is hereby corrected as shown below:

In the Specification

In Column 1, Line 27, delete "Ser".

In Column 1, Line 30, delete "Ser".

In Column 1, Line 42, delete "Ser".

In Column 1, Line 47, delete "Ser".

In Column 1, Line 51, delete "Ser".

In Column 1, Line 56, delete "Ser".

In Column 2, Line 32, delete "Ser".

In Column 2, Line 37, delete "Ser".

In Column 2, Line 41, delete "Ser".

In Column 2, Line 47, delete "Ser".

In Column 3, Line 16, delete "Ser".

In Column 3, Line 20, delete "Ser".

In Column 3, Line 24, delete "Ser".

In Column 3, Line 29, delete "Ser".

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,841,508 B2

In Column 3, Line 57, delete "Ser".

In Column 3, Line 61, delete "Ser".

In Column 3, Line 65, delete "Ser".

In Column 4, Line 5, delete "Ser".

In Column 4, Line 9, delete "Ser".

In Column 4, Line 13, delete "Ser".

In Column 4, Line 19, delete "Ser".

In Column 4, Line 26, delete "Ser".

In Column 4, Line 31, delete "Ser".

In Column 4, Line 35, delete "Ser".

In Column 4, Line 40, delete "Ser".

In Column 8, Line 52, delete "Ser".

In Column 8, Line 53, delete "Ser".

In Column 8, Line 54, delete "Ser".

In Column 8, Line 55, delete "Ser".

In Column 9, Line 1, delete "Ser".

In Column 13, Line 38, delete "Ser".

In Column 15, Line 19, delete "Ser".

In Column 16, Line 29, delete "is" and replace with ---terms---.

In Column 30, Line 9, delete "Ser".

In Column 36, Line 15, delete "Ser".

In Column 36, Line 17, delete "Ser".